US011934601B2

(12) United States Patent
Lee et al.

(10) Patent No.: US 11,934,601 B2
(45) Date of Patent: Mar. 19, 2024

(54) TOUCH DISPLAY DEVICE

(71) Applicant: LG Display Co., Ltd., Seoul (KR)

(72) Inventors: Haewon Lee, Seoul (KR); Jinseong Kim, Paju-si (KR); JuHan Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/971,362

(22) Filed: Oct. 21, 2022

(65) Prior Publication Data
US 2023/0040620 A1 Feb. 9, 2023

Related U.S. Application Data

(62) Division of application No. 17/522,761, filed on Nov. 9, 2021, now Pat. No. 11,507,211.

(30) Foreign Application Priority Data

Dec. 28, 2020 (KR) .................. 10-2020-0184850

(51) Int. Cl.
G06F 3/041 (2006.01)
G06F 3/044 (2006.01)
G09G 3/20 (2006.01)

(52) U.S. Cl.
CPC .......... G06F 3/0412 (2013.01); G06F 3/0446 (2019.05); G09G 3/2092 (2013.01);
(Continued)

(58) Field of Classification Search
CPC ......... G06F 2203/04111; G06F 3/0412; G06F 3/04164; G06F 3/0445; G06F 3/0446; G06F 3/0448
See application file for complete search history.

(56) References Cited

U.S. PATENT DOCUMENTS 9,665,203 B2  5/2017 Xu et al.
9,665,219 B2  5/2017 Lo et al.
(Continued)

FOREIGN PATENT DOCUMENTS

CN  103257769 A  8/2013
JP  2016-045684 A  4/2016
(Continued)

OTHER PUBLICATIONS

European Patent Office, Extended European Search Report, EP Patent Application No. 21211316.1, dated Aug. 25, 2022, 12 pages.

Primary Examiner — Robin J Mishler
(74) Attorney, Agent, or Firm — Fenwick & West LLP

(57) ABSTRACT

A touch display device includes a first horizontal electrode including a plurality of first electrode parts spaced apart from one another in a horizontal direction and a plurality of first bridge parts connecting the plurality of first electrode parts; a second horizontal electrode including a plurality of second electrode parts spaced apart from the first horizontal electrode in a vertical direction and spaced apart from one another in the horizontal direction and a plurality of second bridge parts connecting the plurality of second electrode parts; a third horizontal electrode including a plurality of third electrode parts spaced apart from the second horizontal electrode in the vertical direction and spaced apart from one another in the horizontal direction and a plurality of third bridge parts connecting the plurality of third electrode parts; a first horizontal touch line electrically connected to the first horizontal electrode and disposed to extend in the vertical direction; a second horizontal touch line electrically connected to the second horizontal electrode and disposed to extend in the vertical direction; and a third horizontal touch line electrically connected to the third horizontal electrode and disposed to extend in the vertical direction; a plurality
(Continued)

of first separation electrodes; a plurality of second separation electrodes; a first vertical touch line; and a second vertical touch line.

17 Claims, 21 Drawing Sheets

(52) U.S. Cl.
CPC ............ *G06F 2203/04111* (2013.01); *G09G 2310/0267* (2013.01); *G09G 2310/0275* (2013.01)

(56) References Cited

U.S. PATENT DOCUMENTS

| | | | |
|---|---|---|---|
| 9,851,855 B2 | 12/2017 | Bok | |
| 11,347,363 B2 | 5/2022 | Shih et al. | |
| 2013/0009905 A1* | 1/2013 | Castillo | G06F 3/0414 345/174 |
| 2013/0271689 A1 | 10/2013 | Kim et al. | |
| 2014/0160061 A1* | 6/2014 | Kim | G06F 3/0412 345/174 |
| 2014/0225859 A1 | 8/2014 | Badaye et al. | |
| 2015/0212629 A1 | 7/2015 | Chang et al. | |
| 2015/0234495 A1 | 8/2015 | Lo et al. | |
| 2016/0188071 A1 | 6/2016 | Xu et al. | |
| 2016/0195984 A1* | 7/2016 | Bok | G06F 3/0446 345/173 |
| 2017/0090625 A1* | 3/2017 | Makino | G06F 3/0443 |
| 2017/0228068 A1 | 8/2017 | Pu et al. | |
| 2017/0255296 A1 | 9/2017 | Takiguchi et al. | |
| 2021/0096680 A1 | 4/2021 | Li et al. | |

FOREIGN PATENT DOCUMENTS

| | | |
|---|---|---|
| JP | 2016-518651 A | 6/2016 |
| JP | 2017-117246 A | 6/2017 |
| TW | M481451 U | 7/2014 |
| TW | 201636798 A | 10/2016 |

* cited by examiner

Horizontal Direction →
↓ Vertical Direction

H1 = H1A + H2A + H3A + H4A + ⋯
H2 = H1B + H2B + H3B + H4B + ⋯
H3 = H1C + H2C + H3C + H4C + ⋯
H4 = H1D + H2D + H3D + H4D + ⋯

TOUCH DISPLAY DEVICE

CROSS-REFERENCE TO RELATED APPLICATION

This application is a divisional application of U.S. patent application Ser. No. 17/522,761 filed on Nov. 9, 2021, which claims the priority benefit of Republic of Korea Patent Application No. 10-2020-0184850, filed on Dec. 28, 2020 in the Korean Intellectual Property Office, all of which are incorporated herein by reference in their entirety.

BACKGROUND

Field of the Disclosure

The present disclosure relates to touch display devices.

Description of the Background

Touch display devices increasingly employ a touch-based input function that enables users to easily input information or a command to the display device in an intuitive and convenient manner, in addition to a function of displaying images or data.

In order to provide the touch-based input function, the touch display device is required to have capabilities accurately to detect the presence or absence of a touch from a user and detect coordinates of the touch. To do this, the touch display device includes a touch panel having a touch sensor structure. Here, the touch sensor structure may include a plurality of touch electrodes and a plurality of touch lines.

As the size of the touch panel increases, a number of required touch electrodes increases too. As a result, the number of touch lines disposed on the touch panel increases, and the number of touch channels (corresponding to the touch lines) of the touch driving circuit is also required to be increased. This results in panel manufacturing being more complicated and manufacturing cost increasing, and in turn, an associated touch driving circuit may be more complicated and a cost of manufacturing the touch driving circuit may increase further.

SUMMARY

Embodiments of the present disclosure provide touch display devices having a touch sensor structure capable of reducing the number of touch lines and touch channels while maintaining the accuracy of touch sensing.

Embodiments of the present disclosure provide touch display devices having a touch sensor structure capable of reducing an overlap area between touch electrodes and display lines.

Embodiments of the present disclosure provide touch display devices having a touch sensor structure capable of improving touch sensitivity by reducing a difference in areas (sizes) between two types of touch electrodes (e.g., a horizontal electrode and a vertical electrode).

Embodiments of the present disclosure provide touch display devices having a touch sensor structure capable of reducing the number of touch lines and touch channels while maintaining the accuracy of touch sensing.

According to aspects of present disclosure, a touch display device is provided that includes a first horizontal electrode including a plurality of first electrode parts spaced apart from one another in a horizontal direction and a plurality of first bridge parts connecting the plurality of first electrode parts; a second horizontal electrode including a plurality of second electrode parts spaced apart from the first horizontal electrode in a vertical direction and spaced apart from one another in the horizontal direction and a plurality of second bridge parts connecting the plurality of second electrode parts; a third horizontal electrode including a plurality of third electrode parts spaced apart from the second horizontal electrode in the vertical direction and spaced apart from one another in the horizontal direction and a plurality of third bridge parts connecting the plurality of third electrode parts; a first horizontal touch line electrically connected to the first horizontal electrode and disposed to extend in the vertical direction; a second horizontal touch line electrically connected to the second horizontal electrode and disposed to extend in the vertical direction; and a third horizontal touch line electrically connected to the third horizontal electrode and disposed to extend in the vertical direction. The touch display device according to aspects of the present disclosure may further include a plurality of first separation electrodes located between the plurality of first bridge parts and the plurality of second bridge parts and spaced apart from one another in the horizontal direction; a plurality of second separation electrodes located between the plurality of second bridge parts and the plurality of third bridge parts and spaced apart from one another in the horizontal direction; a first vertical touch line electrically connecting a first separation electrode in a first column of the plurality of first separation electrodes and a second separation electrode in the first column of the plurality of second separation electrodes; and a second vertical touch line electrically connecting a first separation electrode in a second column of the plurality of first separation electrodes and a second separation electrode in the second column of the plurality of second separation electrodes.

The first separation electrode disposed in the first column and the second separation electrode disposed in the first column may be connected by the first vertical touch line and included in a first vertical electrode.

The first separation electrode disposed in the second column and the second separation electrode disposed in the second column may be connected by the second vertical touch line and included in a second vertical electrode.

The first separation electrode disposed in the second column and the second separation electrode disposed in the second column may be disposed between the first horizontal touch line and the second horizontal touch line.

The first separation electrode disposed in the first column may include a first protrusion part interposed between a first electrode part and a second electrode part disposed in the same column.

The second separation electrode disposed in the first column may include a second protrusion part interposed between the second electrode part and a third electrode part disposed in the same column.

A first contact hole through which the first protrusion part and the first vertical touch line are connected, and a second contact hole through which the second protrusion part and the first vertical touch line are connected may be formed in the touch display device.

The first vertical touch line may overlap the second and third electrode parts disposed in the same column, and may be electrically separated from the overlapping second and third electrode parts.

The first horizontal touch line may overlap the second and third electrode parts overlapping the first vertical touch line, be electrically connected to the first electrode part of the first to third electrode parts, and be electrically separated from the second and third electrode parts.

An area of the first protrusion part may be substantially the same as an area of a first bridge part in the first column of the plurality of first bridge parts.

The first horizontal touch line may be connected to one of the plurality of first electrode parts and the plurality of first bridge parts of the first horizontal electrode, the second horizontal touch line may be connected to one of the plurality of second electrode parts and the plurality of second bridge parts of the second horizontal electrode, and the third horizontal touch line may be connected to one of the plurality of third electrode parts and the plurality of third bridge parts of the third horizontal electrode.

Each of the first horizontal electrode, the second horizontal electrode, the third horizontal electrode, the plurality of first separation electrodes, and the plurality of second separation electrodes may be formed such that one or more of first layer electrodes and one or more of second layer electrodes are located in different layers and disposed to be electrically connected.

According to aspects of present disclosure, a touch display device is provided that includes a first vertical electrode disposed to extend in a vertical direction; a second vertical electrode spaced apart from the first vertical electrode in a horizontal direction and disposed to extend in the vertical direction; a third vertical electrode spaced apart from the second vertical electrode in the horizontal direction and disposed to extend in the vertical direction; a first vertical touch line electrically connected to the first vertical electrode and disposed to extend in the vertical direction; a second vertical touch line electrically connected to the second vertical electrode and disposed to extend in the vertical direction; and a third vertical touch line electrically connected to the third vertical electrode and disposed to extend in the vertical direction. The touch display device according to aspects of present disclosure may further include a plurality of first separation electrodes located between the first vertical electrode and the second vertical electrode and spaced apart from one another in the vertical direction; a plurality of second separation electrodes located between the second vertical electrode and the third vertical electrode and spaced apart from one another in the vertical direction; a first horizontal connection line electrically connecting a first separation electrode in a first row of the plurality of first separation electrodes and a second separation electrode in the first row of the plurality of second separation electrodes; a first horizontal touch line electrically connected to the first horizontal connection line and disposed to extend in the vertical direction; a second horizontal connection line electrically connecting a first separation electrode in a second row of the plurality of first separation electrodes and a second separation electrode in the second row of the plurality of second separation electrodes; and a second horizontal touch line electrically connected to the second horizontal connection line and disposed to extend in the vertical direction.

The second vertical electrode may have a plurality of grooves formed on each of one side and the other side thereof.

Each of the plurality of first separation electrodes may include a protrusion part located in a space provided by a corresponding groove of the plurality of grooves formed on the one side of the second vertical electrode.

Each of the plurality of second separation electrodes may include a protrusion part located in a space provided by a corresponding groove of the plurality of grooves formed on the other side of the second vertical electrode.

The third vertical electrode may have a plurality of grooves formed on each of one side and the other side thereof.

Each of the plurality of second separation electrodes may include a protrusion part located in a space provided by a corresponding groove of the plurality of grooves formed on the one side of the third vertical electrode.

The first horizontal connection line may run across the grooves formed on each of the one side and the other side of the second vertical electrode and the grooves formed on each of the one side and the other side of the third vertical electrode.

The first vertical touch line may be disposed to extend in the horizontal direction, and then, bend and extend in the vertical direction while overlapping all, or one or more, of the plurality of first separation electrodes. The first vertical touch line may be electrically separated from all, or one or more, of the overlapping first separation electrodes.

The first horizontal touch line may overlap all, or one or more, of the plurality of first separation electrodes overlapping the first vertical touch line.

The first horizontal touch line may be electrically connected to a first separation electrode in a first row of all, or one or more, of the plurality of first separation electrodes overlapping the first vertical touch line, and be electrically separated from one or more first separation electrodes disposed in the remaining rows except for the first row.

One gate line may run across the first vertical electrode, the first separation electrode, the second vertical electrode, the second separation electrode, and the third vertical electrode.

Each of the first vertical electrode, the second vertical electrode, the third vertical electrode, the plurality of first separation electrodes, and the plurality of second separation electrodes may be formed such that one or more first layer electrodes and one or more second layer electrodes are located in different layers and disposed to be electrically connected.

According to embodiments of the present disclosure, it is possible to provide touch display devices having a touch sensor structure capable of reducing the number of touch lines and touch channels while maintaining the accuracy of touch sensing.

According to embodiments of the present disclosure, it is possible to provide touch display devices having a touch sensor structure capable of reducing an overlap area between touch electrodes and display lines.

According to embodiments of the present disclosure, it is possible to provide touch display devices having a touch sensor structure capable of improving touch sensitivity by reducing a difference in areas (sizes) between two types of touch electrodes (e.g., a horizontal electrode and a vertical electrode).

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
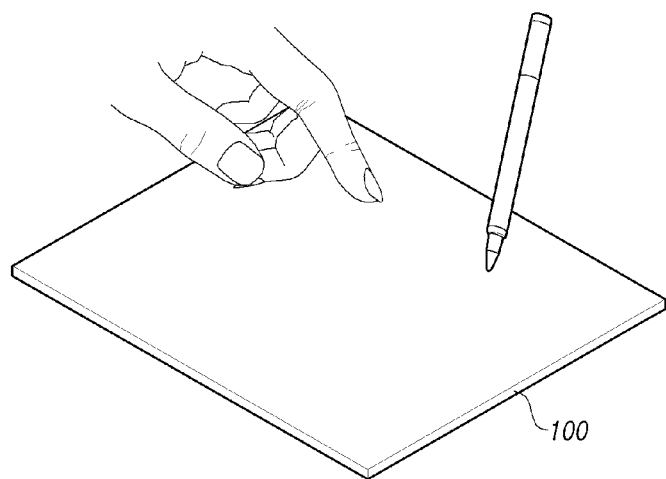
FIG. 1 illustrates a system configuration of a touch display device according to aspects of the present disclosure.

Hereinafter, the present preferred embodiments of the disclosure will be described in detail with reference to the accompanying drawings. In denoting elements of the drawings by reference numerals, the same elements will be referenced by the same reference numerals even when the elements are illustrated in different drawings. In the following description of the disclosure, detailed description of known functions and configurations incorporated herein may be omitted when it may make the subject matter of the disclosure rather unclear. The terms such as "including", "having", "containing", and "comprising" used herein are generally intended to allow other components to be added unless the terms are used with the term "only". Singular forms used herein are intended to include plural forms unless the context clearly indicates otherwise.

Further, the terms "first", "second", "A", "B", "(a)", "(b)", or the like may be used to describe elements included in embodiments of the present disclosure. Each of the terms is not used to define essence, order, sequence, or number of an element, but is used merely to distinguish the corresponding element from another element.

Herein, situations in which two or more elements included in embodiments of the present disclosure are connected, combined, coupled, or the like may include not only directly or physically connecting, combining, coupling, or contacting between two or more elements, but interposing of another element between the two or more elements. Here, the another element may be included in one or more of the two or more elements connected, combined, coupled, or contacted (to) one another.

In describing time relative terms with reference to elements, operations, steps, or processes included in embodiments of the present disclosure, situations in which "after", "subsequent to", "next to", "before", or the like is used to describe a temporal sequential relationship or a flow sequential relationship between events, situations, cases, operations, or the like are generally intended to include events, situations, cases, operations, or the like that do not occur consecutively unless the terms, such as "directly", "immediately", or the like, are used.

Meanwhile, when numerical values for elements included in embodiments of the present disclosure or their associated information (e.g., levels etc.) are described, even when specific relevant descriptions are not given, the numerical values or the associated information may be interpreted as including a margin of error that can be caused by several factors (e.g., factors in the process, internal or external impact, noise, etc.).

FIG. 1 illustrates a touch display device 100 according to aspects of the present disclosure.

The touch display device 100 according to aspects of the present disclosure is capable of providing an image display function of displaying images, and a touch sensing function of sensing a touch by a touch object such as a finger, a pen, and/or the like. Here, the term 'pen' is sometimes referred to as a stylus or a stylus pen, and may include an active pen that has signal transmission and reception functions, is able to perform an operation through interlinking with the touch display device 100, and/or includes its own power supply, a passive pen that does not have signal transmission and reception functions and/or does not include its own power supply, and the like.

In one embodiment, the touch display device 100 may be a television (TV), a computer monitor, a vehicle monitor, or the like, or may be a mobile device such as a tablet, a smart phone, and the like.

In one embodiment, the touch display device 100 may include a display part for displaying images and a touch sensing part for sensing touches.

Hereinafter, a display part and a touch sensing part of the touch display device 100 will be described in more detail with reference to FIGS. 2A and 2B.

Figure 2A:
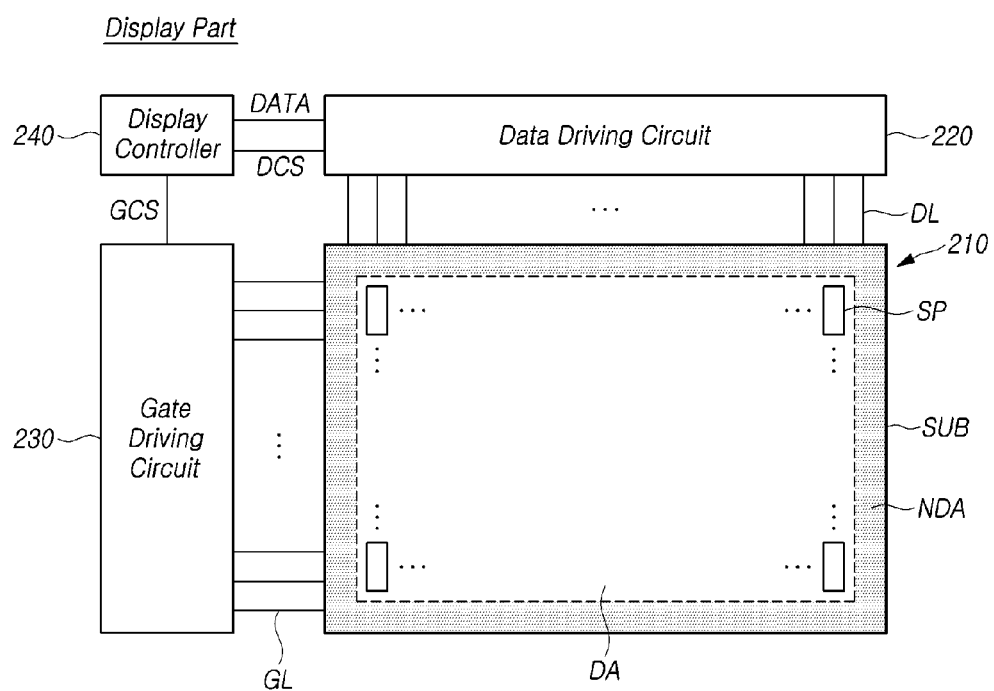
FIG. 2A illustrates a display part of the touch display device according to aspects of the present disclosure.

FIG. 2A illustrates the display part of the touch display device 100 according to aspects of the present disclosure.

Referring to FIG. 2A, the display part of the touch display device 100 according to aspects of the present disclosure includes a display panel 210, a data driving circuit 220, a gate driving circuit 230, a display controller 240, and the like.

The display panel 210 includes a substrate SUB, a plurality of data lines DL and a plurality of gate lines GL disposed on or over the substrate SUB, and a plurality of sub-pixels SP disposed on or over the substrate SUB and connected to the plurality of data lines DL and the plurality of gate lines GL.

The display panel 210 may include a display area DA in which an image is displayed and a non-display area NDA in which an image is not displayed. The plurality of sub-pixels SP may be disposed in the display area DA of the display panel 210. Various types of signal lines may be disposed in the non-display area NDA of the display panel 210.

The data driving circuit 220 and the gate driving circuit 230 may be electrically connected to the non-display area NDA of the display panel 210.

The data driving circuit 220 can drive the plurality of data lines DL by supplying data voltages to the plurality of data lines DL.

The gate driving circuit 230 can drive the plurality of gate lines GL by supplying gate signals (referred to as scan signals) to the plurality of gate lines GL.

The display controller 240 can control operations of the data driving circuit 220 and the gate driving circuit 230 by supplying various types of control signals DCS and GCS to the data driving circuit 220 and the gate driving circuit 230.

The display controller 240 starts a scanning operation according to timings scheduled in each frame, converts image data inputted from other devices or other image providing sources (e.g., a host system) to a data signal type used in the data driving circuit 220 and then supplies image data DATA resulting from the converting to the data driving circuit 220, and controls the loading of the data to at least one pixel at a pre-configured time according to a scan timing.

The display controller 240 may be a timing controller TCON used in a typical display device, or a controller including the timing controller.

The display controller 240 may be implemented in a separate component from the data driving circuit 220, or integrated with the data driving circuit 220 and implemented into an integrated circuit.

The data driving circuit 220 may be located on, but not limited to, only one side (e.g., an upper portion or a lower portion) of the display panel 210, or in another embodiment, the data driving circuit 220 may be located on, but not limited to, two sides (e.g., the upper portion and the lower portion) of the display panel 210, according to driving schemes, panel design schemes, or the like.

The data driving circuit 220 may be electrically connected to the non-display area NDA of the display panel 210. In another embodiment, the data driving circuit 220 may be disposed to overlap the display area DA of the display panel 210.

The data driving circuit 220 may be implemented by including at least one source driver integrated circuit. Each source driver integrated circuit may include a shift register, a latch circuit, a digital-to-analog converter DAC, an output buffer, and the like. In some embodiments, each source driver integrated circuit may further include an analog-to-digital converter according to design schemes.

In some embodiments, the data driving circuit 220 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type.

The gate driving circuit 230 may be located on, but not limited to, only one side (e.g., an upper portion, a lower portion, a left side, or a right side) of the display panel 210, or in another embodiment, the gate driving circuit 230 may be located on, but not limited to, two sides (e.g., the upper portion and the lower portion, or the left side and the right side) of the display panel 210, according to driving schemes, panel design schemes, or the like.

The gate driving circuit 230 may be electrically connected to, or disposed in, the non-display area NDA of the display panel 210. In another embodiment, the gate driving circuit 230 may be disposed to overlap the display area DA of the display panel 210.

The gate driving circuit 230 may be implemented by including at least one gate driver integrated circuit. Each gate driver integrated circuit may include a shift register, a level shifter, and the like.

In some embodiments, the gate driving circuit 230 may be connected to the display panel 210 in a tape automated bonding (TAB) type, or connected to a conductive pad such as a bonding pad of the display panel 210 in a chip on glass (COG) type or a chip on panel (COP) type, or connected to the display panel 210 in a chip on film (COF) type. In another embodiment, the gate driving circuit 230 may be located in the non-display area NDA of the display panel 210 in a gate in panel (GIP) type. The gate driving circuit 230 may be disposed on or over a substrate SUB, or connected to the substrate SUB. That is, in the case of the GIP type, the gate driving circuit 230 may be disposed in the non-display area NDA of the substrate SUB. The gate driving circuit 230 may be connected to the substrate SUB in the case of the chip on glass (COG) type, the chip on film (COF) type, or the like.

At least one of the data driving circuit 220 and the gate driving circuit 230 may be disposed in the display area DA. For example, at least one of the data driving circuit 220 and the gate driving circuit 230 may be disposed not to overlap sub-pixels SP, or disposed to overlap one or more, or all, of the sub-pixels SP.

The display panel 210 may be one of various types of display panels such as a liquid crystal display panel, an organic light emitting display panel, an electroluminescence display panel, a plasma display panel, and the like.

Figure 2B:
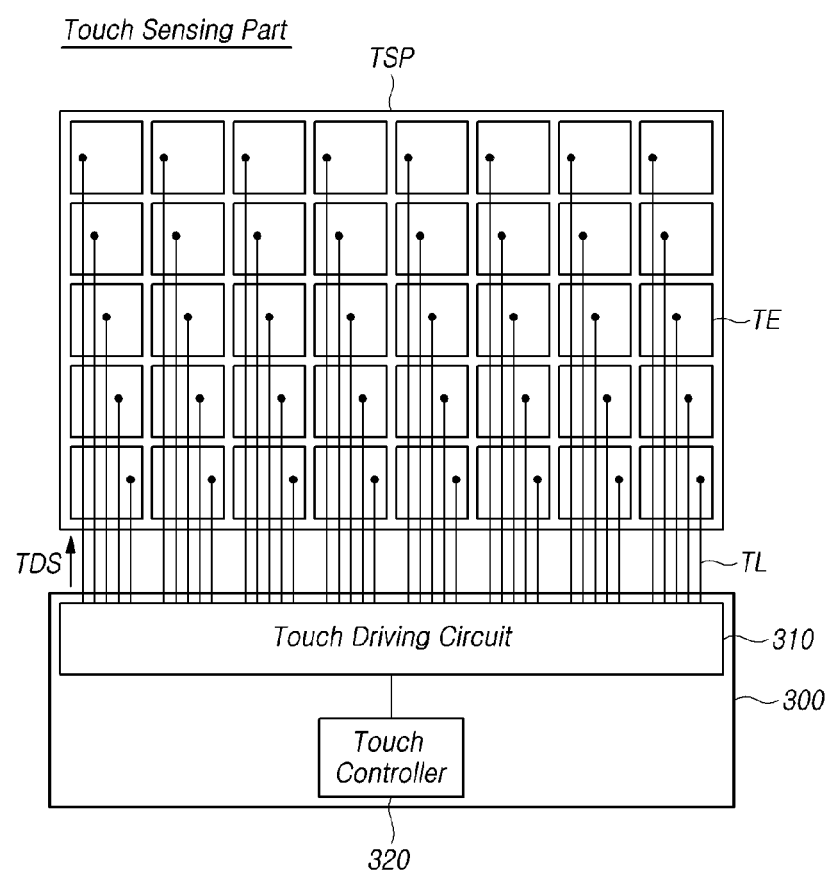
FIG. 2B illustrates a touch sensing part of the touch display device according to aspects of the present disclosure.

FIG. 2B illustrates the touch sensing part of the touch display device 100 according to aspects of the present disclosure.

Referring to FIG. 2B, the touch display device 100 according to aspects of the present disclosure may include a touch panel TSP and a touch sensing circuit 300 to sense a touch input by a finger and/or a pen.

The touch sensing circuit 300 may include a touch driving circuit 310 that drives and senses the touch panel TSP and outputs sensed data, and a touch controller 320 that receives the sensed data from the touch driving circuit 310 and calculates a touch position.

The touch panel TSP may include one or more touch sensors including a plurality of touch electrodes TE. The touch panel TSP may further include a plurality of touch lines TL for electrically connecting the plurality of touch electrodes TE to the touch driving circuit 310.

The touch driving circuit 310 can supply a touch driving signal TDS to one or more, or all, of the plurality of touch electrodes TE, generate sensing data by sensing one or more, or all, of the plurality of touch electrodes TE, and supply the generated sensing data to the touch controller 320. Here, the sensing of the touch electrode TE by the touch driving circuit 310 may mean detecting an electric signal from the touch electrode TE.

The touch controller 320 may acquire the presence or absence of a touch and/or a touch coordinate (a touch position) by using the sensing data received from the touch driving circuit 310.

The touch driving signal TDS may be a signal whose voltage level is changed over time. In an embodiment, the touch driving signal TDS may have one or more of various types of signals, such as a square wave, a triangle wave, a sine wave, or the like.

The touch display device 100 can provide a self-capacitance-based touch sensing function that senses a touch by measuring a capacitance formed across each touch electrode TE or a change in such capacitance, or a mutual-capacitance-based touch sensing function that senses a touch by measuring a capacitance between touch electrodes TE or a change in such capacitance.

The touch display device 100 according to aspects described herein can provide both the self-capacitance-based touch sensing function and the mutual-capacitance-based touch sensing function. For example, the touch display device 100 may provide the self-capacitance-based touch sensing function and the mutual-capacitance-based touch sensing function in different times or different situations.

When the touch display device 100 provides the self-capacitance-based touch sensing function, the touch driving circuit 310 can supply a touch driving signal TDS to each of the plurality of touch electrodes TE, and sense the touch electrode to which the touch driving signal is applied, and output sensing data, which are generated based on the sensed result. Here, the sensed result corresponds to a capacitance formed between a touch object such as a finger, a pen or the like and the touch electrode TE.

When the touch display device 100 provides the mutual-capacitance-based touch sensing function, the plurality of touch electrodes TE are divided into driving touch electrodes and sensing touch electrodes, and the touch driving circuit 310 can supply a touch driving signal TDS to the driving touch electrodes, sense the sensing touch electrodes, and output sensing data, which are generated based on the sensed result. Here, the sensed result corresponds to a capacitance formed between the sensing touch electrode and the driving touch electrode.

Figure 3:
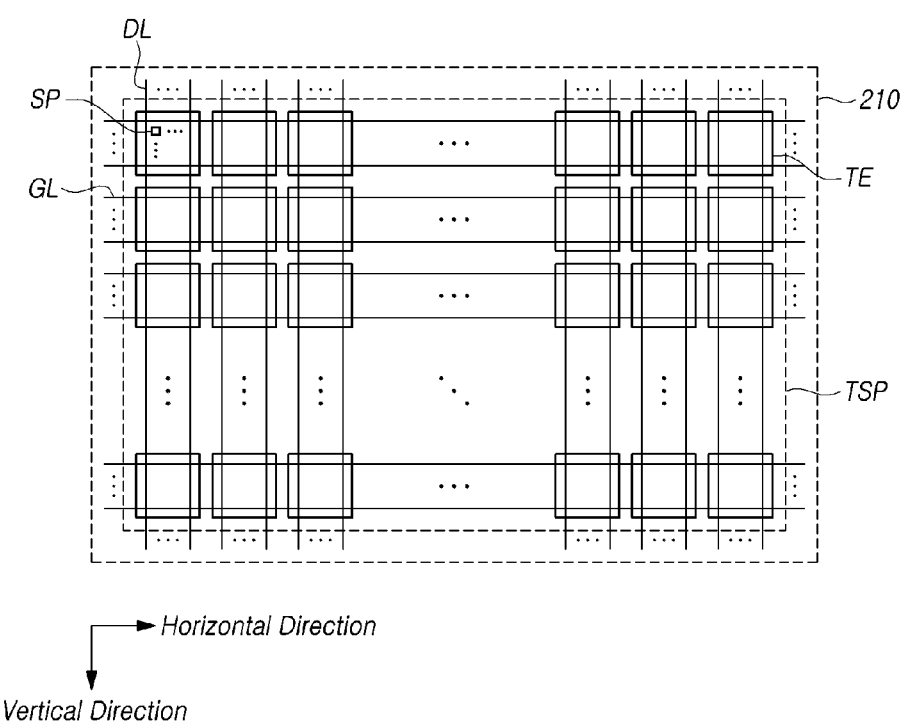
FIG. 3 illustrates a display panel and a touch panel of the touch display device according to aspects of the present disclosure.

FIG. 3 illustrates the display panel 210 and touch panel TSP of the touch display device 100 according to aspects of the present disclosure.

Referring to FIG. 3, in the touch display device 100 according to aspects of the present disclosure, the touch panel TSP may be located outside of the display panel 210 or may be embedded in the display panel 210.

When the touch panel TSP is located outside of the display panel 210, the touch panel TSP and the display panel 210 are manufactured in different manufacturing processes, and thereafter, the touch panel TSP and the display panel 210 can be bonded.

When the touch panel TSP is embedded in the display panel 210, a plurality of touch electrodes TE may be formed together during a process in which the display panel 210 is manufactured.

Meanwhile, the plurality of touch electrodes TE may be dedicated electrodes for touch sensing. In another embodiment, the plurality of touch electrodes TE may be electrodes that may be utilized even when display driving is performed. For example, the plurality of touch electrodes TE may be used for display driving as a common electrode to which a common voltage is applied, as well as being used for touch sensing.

Hereinafter, for convenience of description, it is assumed that the touch display device 100 provides the self-capacitance-based touch sensing function, and the touch panel TSP is embedded in the display panel 210.

In an embodiment, in the touch panel TSP of the touch display device 100 according to aspects of the present disclosure, a plurality of touch electrodes TE may be arranged in a matrix pattern.

Each of the plurality of touch electrodes TE may be electrically connected to the touch driving circuit 310 through one or more touch lines TL.

A plurality of touch lines TL may overlap one or more touch electrodes TE. In some embodiments, the plurality of touch lines TL may be connected to the touch driving circuit 310 by running along an area where the plurality of touch electrodes TE are not disposed.

Although the drawings illustrate that one touch electrode TE or an area occupied by one touch electrode TE has a square block shape, this is merely an example for convenience of description; embodiments described herein are not limited thereto. In an embodiment, the touch electrode TE may be designed in various shapes, such as a diamond, a long rectangle, or the like. Although FIG. 2B illustrates that each touch electrode TE or an area occupied by each touch electrode TE has the same size and shape, this is merely an example for convenience of description; embodiments described herein are not limited thereto. In an embodiment, at least one of one or more sizes and shapes of one or more of the plurality of touch electrodes TE or one or more areas occupied by one or more of the plurality of touch electrodes TE may be different from at least one of one or more sizes and shapes of one or more other touch electrodes of the plurality of touch electrodes TE or one or more areas occupied by one or more other touch electrodes of the plurality of touch electrodes TE.

One touch electrode TE may be a plate-type electrode having no opening or a mesh-type electrode having at least one opening.

As described above, the touch panel TSP may be embedded in the display panel 210. In this embodiment, a plurality of touch electrodes TE may be formed together in a process of manufacturing the display panel 210.

A size of an area in which one touch electrode TE is disposed may correspond to a size of an area in which one sub-pixel SP is disposed. In another embodiment, as illustrated in FIG. 3, a size of an area in which one touch electrode TE is disposed may be larger than a size of an area in which one sub-pixel SP is disposed.

When a size of an area in which one touch electrode TE is disposed is larger than a size of an area in which two or more sub-pixels SP are disposed, one touch electrode TE may overlap two or more data lines DL and two or more gate lines GL.

The touch driving circuit 310 and the touch controller 320 may be implemented in respective separate components or integrated into one component.

In an embodiment, the touch driving circuit 310 may be implemented in a readout IC, and the touch controller 320 may be implemented in a micro control unit MCU.

Meanwhile, the touch driving circuit 310 and the data driving circuit 220 may be integrated and implemented in one integrated circuit chip. The driving circuit in which the touch driving circuit 310 and the data driving circuit 220 are integrated may be implemented as one or more integrated circuit chips.

In an embodiment, a touch driving signal TDS may have one or more of various types of signals, such as a square wave, a triangle wave, a sine wave, or the like. In an embodiment, when the touch driving signal TDS of the square wave is employed, such a touch driving signal TDS may be a type of a pulse width modulation (PWM) signal.

Referring to FIG. 3, one or more data lines DL and one or more gate lines GL can cross each other. That is, the data line DL may extend in a first direction, and the gate line GL may extend in a second direction different from the first direction.

For example, the first direction may be a vertical direction, and the second direction may be a horizontal direction. In another example, the first direction may be the horizontal direction, and the second direction may be the vertical direction.

The vertical direction and the horizontal direction described herein are merely used for distinguishing two different directions. The vertical direction and the horizontal direction are only relative directions to each other and may be interchanged with each other. That is, the vertical direction described below may be expressed as the horizontal direction or another direction according to viewing directions. Likewise, the horizontal direction described below may be expressed as the vertical direction or another direction according to viewing directions.

The vertical direction described herein may mean a direction in which one data line DL disposed in the touch display device runs (extends), and the horizontal direction may mean a direction in which one gate line GL disposed in the touch display device runs (extends).

Figure 4:
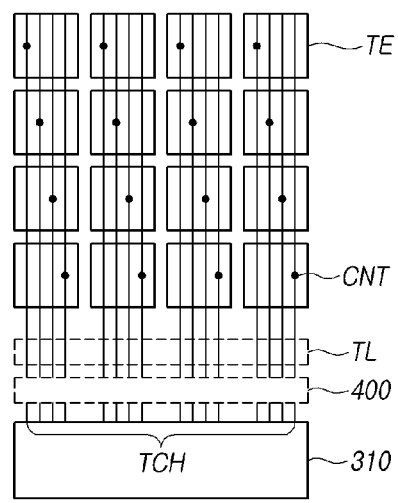
FIG. 4 illustrates a part of an example split-type touch sensor structure in the touch display device according to aspects of the present disclosure.

FIG. 4 illustrates a part of an example split-type touch sensor structure in the touch display device 100 according to aspects of the present disclosure.

Referring to FIG. 4, a touch panel TSP of the touch display device 100 according to aspects of the present disclosure may include a plurality of touch electrodes TE as touch sensors, and the plurality of touch electrodes TE may be disposed by being separated from each other.

The plurality of touch electrodes TE are not only physically separated from each other, but also electrically separated from one another. Such a touch sensor structure is referred to as the split-type touch sensor structure. However, two or more, or all, of the plurality of touch electrodes TE may be electrically connected in the touch driving circuit 310.

In the case of the split-type touch sensor structure, each of the plurality of touch electrodes TE may be electrically connected to a touch line TL through one or more contact holes CNT.

The plurality of touch electrodes TE may be located in the display area DA. In some embodiments, one or more of the plurality of touch electrodes TE (e.g., one or more outermost touch electrodes) may be located in an edge area (an outer edge) of the display area DA or disposed to extend up to the edge area (the outer edge) of the display area DA. Here, the display area DA is an area in which an image is displayed, and may be an area in which touch sensing is available.

As shown in FIG. 4, a plurality of touch lines TL electrically connected to the plurality of touch electrodes TE may be located in the display area DA. In some embodiments, one or more, or all, of the plurality of touch lines TL may be located in an edge of the display area DA.

As shown in FIG. 4, when the plurality of touch lines TL electrically connected to the plurality of touch electrodes TE are located in the display area DA, the plurality of touch lines TL may be located in one or more different layers from the plurality of touch electrodes TE and overlap the plurality of touch electrodes TE.

Referring to FIG. 4, all of the plurality of touch lines TL may have a length equal or similar to one another. That is, the plurality of touch lines TL may be disposed from a pad portion 400 to which the touch driving circuit 310 is connected to a location opposite to the pad portion 400 regardless of a location of the contact hole CNT.

In another embodiment, a length of each of the plurality of touch lines TL may be different depending on a location of a touch electrode TE electrically connected thereto. Accordingly, the length of each of the plurality of touch lines TL may be a distance from the pad portion 400 to a location at which the corresponding contact hole CNT is located.

Referring to FIG. 4, in the case of the split-type touch sensor structure, in a situation where one touch electrode TE is electrically connected to one touch line TL, the number of the plurality of touch lines TL is required as many as the number of the plurality of touch electrodes. Here, the number of the plurality of touch lines TL corresponds to the number of touch channels TCH through which signals are input to, or output from, the touch driving circuit 310.

According to the illustration of FIG. 4, the split-type touch sensor structure may include 16 touch electrodes TE arranged in 4 rows and 4 columns, and include 16 touch lines TL for electrically connecting the 16 touch electrodes TE to the touch driving circuit 310. Accordingly, the touch driving circuit 310 has 16 touch channels TCH.

In the case of the split-type touch sensor structure, the number of touch electrodes TE is a value obtained by multiplying the number of touch electrode rows by the number of touch electrode columns, and the number of touch lines TL and the number of touch channels TCH may be the same as the number of touch electrodes TE.

In the case of the split-type touch sensor structure, as the number of touch electrodes TE increases, the number of touch lines TL and the number of touch channels TCH may also increase.

When a size of the touch panel TSP is increased or the number of touch electrodes TE is increased to improve the accuracy of touch sensing, the number of touch lines TL is increased, and the number of touch channels TCH of the touch driving circuit 310 is also increased. Due to this, the manufacturing of the panel becomes complicated and difficult, and the internal circuit structure of the touch driving circuit 310 may become complicated due to the large number of touch channels TCH.

Meanwhile, the split-type touch sensor structure as shown in FIG. 4 may be a touch sensor for sensing a touch based on a self-capacitance of each touch electrode TE, or be a touch sensor for sensing the touch based on a mutual-capacitance between touch electrodes TE.

Figure 5:
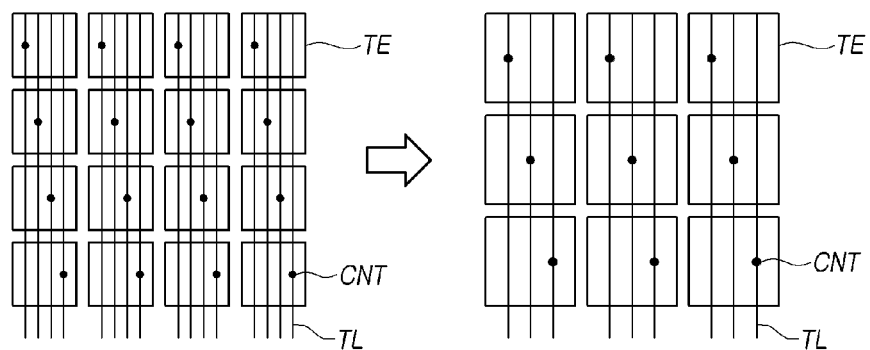
FIG. 5 illustrates a method for reducing the number of touch channels in the split-type touch sensor structure of the touch display device according to aspects of the present disclosure.

FIG. 5 illustrates a method for reducing the number of touch channels in the split-type touch sensor structure of the touch display device 100 according to aspects of the present disclosure.

Referring to FIG. 5, in order to reduce the number of touch lines TL and the number of touch channels TCH, in the case of the split-type touch sensor structure, a size of the touch electrode TE may be increased.

According to the illustration of FIG. 5, by increasing a size of one touch electrode TE, the number of touch electrodes TE disposed in the same area may be reduced from 16 to 9. Accordingly, the number of touch lines TL and the number of touch channels TCH may be also reduced from 16 to 9.

As described above, by increasing the size of one touch electrode TE, the number of touch electrodes TE, the number of touch lines TL, and the number of touch channels TCH can be reduced.

However, when the size of one touch electrode TE is increased, the number of points for sensing a change in capacitance in the same area may be reduced. That is, when the size of one touch electrode TE is increased, the number of touch nodes corresponding to touch coordinates in the same area may be reduced from 16 to 9. Here, in the split-type touch sensor structure, one touch node may be one touch electrode TE.

Accordingly, the accuracy of touch sensing may become poor. For example, when the size of the touch electrode is increased, the touch sensing circuit 300 may not distinguish between two different touch locations.

Accordingly, according to embodiments of the present disclosure, a woven-type touch sensor structure is provided capable of reducing the number of touch lines TL and the number of touch channels TCH while remaining the accuracy of touch sensing, by designing the number of touch nodes corresponding to touch coordinates to be equal or similar to the number of touch nodes in the split-type touch sensor structure as shown in FIG. 4.

Figure 6:
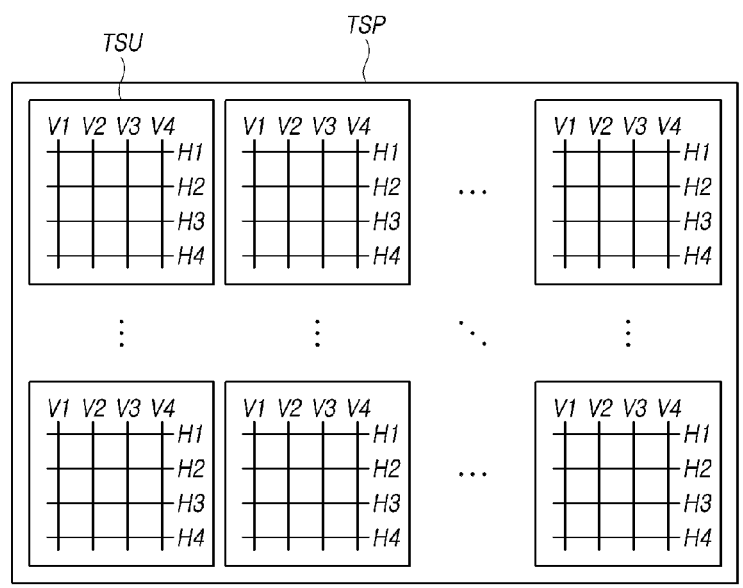
FIG. 6 illustrates example touch sensor units in a woven-type touch sensor structure of the touch display device according to aspects of the present disclosure.

FIG. 6 illustrates example touch sensor units in the woven-type touch sensor structure of the touch display device 100 according to aspects of the present disclosure.

Referring to FIG. 6, in the touch display device 100 according to aspects of the present invention, a basic unit of the woven-type touch sensor structure is referred to as a touch sensor unit TSU. That is, the woven-type touch sensor structure includes two or more touch sensor units TSU.

Herein, it is assumed that an area occupied by one touch sensor unit TSU included in the woven-type touch sensor structure is the same as an area occupied by that in the split-type touch sensor structure of FIG. 4.

Referring to FIG. 6, each touch sensor unit TSU may include four horizontal electrodes (H1-H4) and four vertical electrodes (V1-V4).

Although FIG. 6 illustrates that in each touch sensor unit TSU, four horizontal electrodes (H1-H4) and four vertical electrodes (V1-V4) are disposed in a simple matrix form, such an electrode arrangement is for simply representing, as an equivalent structure, an arrangement structure of the four horizontal electrodes (H1-H4) and the four vertical electrodes (V1-V4) according to the structure of the weave-type touch sensor, and thus, in an actual implementation, the corresponding electrode may be formed with a more complicated arrangement. This will be described in more detail below.

Figure 7:
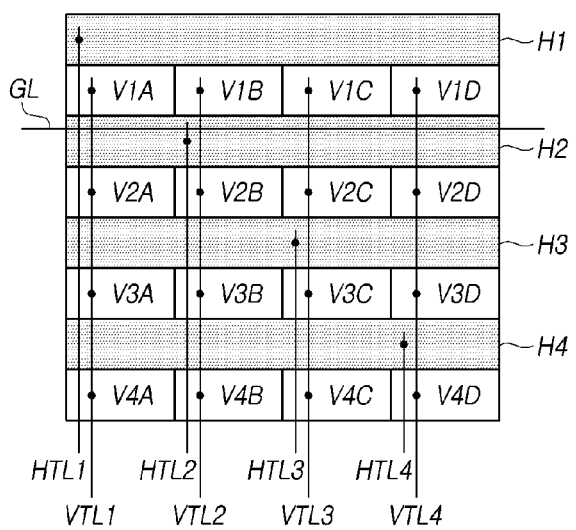
FIG. 7 illustrates an example touch sensor unit in the woven-type touch sensor structure of the touch display device according to aspects of the present disclosure.

FIG. 7 illustrates an example touch sensor unit TSU in the woven-type touch sensor structure of the touch display device 100 according to aspects of the present disclosure.

Referring to FIG. 7, the touch display device according to aspects of the present disclosure can have the woven-type touch sensor structure capable of reducing the number of touch lines TL and the number of touch channels TCH while remaining the accuracy of touch sensing by designing the number of touch nodes corresponding to touch coordinates to be equal, or similar, to the number of touch nodes in the split-type touch sensor structure as shown in FIG. 4.

Herein, "woven type" may mean that electrodes (H1-H4, V1A-V1D, V2A-V2D, V3A-V3D, V4A-V4D) are intricately entangled.

Referring to FIG. 7, a touch sensor unit TSU having the woven-type touch sensor structure according to embodiments of the present disclosure may include a first horizontal electrode H1, a second horizontal electrode H2, a third horizontal electrode H3 and a fourth horizontal electrode H4.

Each of the first horizontal electrode H1, the second horizontal electrode H2, the third horizontal electrode H3, and the fourth horizontal electrode H4 runs in the horizontal direction. Each of the first horizontal electrode H1, the second horizontal electrode H2, the third horizontal electrode H3, and the fourth horizontal electrode H4 is spaced apart from one another in the vertical direction.

Referring to FIG. 7, for electrically connecting the first horizontal electrode H1, the second horizontal electrode H2, and the third horizontal electrode H3 and the fourth horizontal electrode H4 to the touch driving circuit 310, the touch sensor unit TSU having the woven-type touch sensor structure according to embodiments of the present disclosure may further include a first horizontal touch line HTL1, a second horizontal touch line HTL2, a third horizontal touch line HTL3, and a fourth horizontal touch line HTL4.

Referring to FIG. 7, the touch sensor unit TSU having the woven-type touch sensor structure according to embodiments of the present disclosure may include a plurality of first separation electrodes (V1A, V1B, V1C, and V1D) located between the first horizontal electrode H1 and the second horizontal electrode H2 and spaced apart from one another in the horizontal direction, a plurality of second separation electrodes (V2A, V2B, V2C, and V2D) located between the second horizontal electrode H2 and the third horizontal electrode H3 and spaced apart from one another in the horizontal direction, a plurality of third separation electrodes (V3A, V3B, V3C, and V3D) located between the third horizontal electrode H3 and the fourth horizontal electrode H4 and spaced apart from one another in the horizontal direction, and a plurality of fourth separation electrodes (V4A, V4B, V4C, and V4D) located adjacent to the fourth horizontal electrode H4 in the vertical direction and spaced apart from one another in the horizontal direction.

Referring to FIG. 7, to form first to fourth vertical electrodes (V1-V4) using the separation electrodes (V1A-V1D, V2A-V2D, V3A-V3D, and V4A-V4D), the touch sensor unit TSU having the woven-type touch sensor structure according to embodiments of the present disclosure may include a first vertical touch line VTL1, a second vertical touch line VTL2, a third vertical touch line VTL3, and a fourth vertical touch line VTL4.

The first vertical touch line VTL1 may electrically connect a first separation electrode V1A disposed in a first column, a second separation electrode V2A disposed in the first column, a third separation electrode V3A disposed in the first column, and a fourth separation electrode V4A disposed in the first column, thus, resulting in these separation electrodes (V1A-V4A) being electrically connected together or simultaneously to the touch driving circuit 310.

The first separation electrode V1A disposed in the first column, the second separation electrode V2A disposed in the first column, the third separation electrode V3A disposed in the first column, and the fourth separation electrode V4A disposed in the first column are included in the first vertical electrode V1.

The second vertical touch line VTL2 may electrically connect a first separation electrode V1B disposed in a second column, a second separation electrode V2B disposed in the second column, a third separation electrode V3B disposed in the second column, and a fourth separation electrode V4B disposed in the second column, thus, resulting in these separation electrodes (V1B-V4B) being electrically connected together or simultaneously to the touch driving circuit 310.

The first separation electrode V1B disposed in the second column, the second separation electrode V2B disposed in the second column, the third separation electrode V3B disposed in the second column, and the fourth separation electrode V4B disposed in the second column are included in the second vertical electrode V2.

The third vertical touch line VTL3 may electrically connect a first separation electrode V1C disposed in a third column, a second separation electrode V2C disposed in the third column, a third separation electrode V3C disposed in the third column, and a fourth separation electrode V4C disposed in the third column, thus, resulting in these separation electrodes (V1C-V4C) being electrically connected together or simultaneously to the touch driving circuit 310.

The first separation electrode V1C disposed in the third column, the second separation electrode V2C disposed in the third column, the third separation electrode V3C disposed in the third column, and the fourth separation electrode V4C disposed in the third column are included in the third vertical electrode V3.

The fourth vertical touch line VTL4 may electrically connect a first separation electrode V1D disposed in a fourth column, a second separation electrode V2D disposed in the fourth column, a third separation electrode V3D disposed in the fourth column, and a fourth separation electrode V4D disposed in the fourth column, thus, resulting in these separation electrodes (V1D-V4D) being electrically connected together or simultaneously to the touch driving circuit 310.

The first separation electrode V1D disposed in the fourth column, the second separation electrode V2D disposed in the fourth column, the third separation electrode V3D disposed in the fourth column, and the fourth separation electrode V4D disposed in the fourth column are included in the fourth vertical electrode V4.

According to the woven-type touch sensor structure according to embodiments of the present disclosure, in the touch sensor unit TSU occupying the same area as that of the split-type touch sensor structure of FIG. 4, the four horizontal electrodes (H1-H4) and four vertical electrodes (V1-V4) can be disposed, resulting in a total of 16 touch nodes being formed. Here, in the woven-type touch sensor structure, one touch node means an area in which one horizontal electrode and one vertical electrode cross each other.

The touch sensor unit TSU having the woven-type touch sensor structure according to embodiments of the present disclosure may include four horizontal touch lines (HTL1-HTL4) and four vertical touch lines (VTL1-VTL4), resulting in a total of eight touch lines TL being needed. Thus, the number of touch lines TL needed in the woven-type touch sensor structure can be reduced to half of the number (16) of touch lines TL needed in the split-type touch sensor structure of FIG. 4.

Accordingly, the woven-type touch sensor structure according to embodiments of the present disclosure can maintain the same number of touch nodes as the split-type touch sensor structure of FIG. 4, and thereby, the number of touch lines TL and the number of touch channels TCH can be reduced while maintaining the accuracy of touch sensing.

Meanwhile, in the woven-type touch sensor structure shown in FIG. 7, the horizontal electrodes (H1-H4) may be disposed in parallel to gate lines GL. Accordingly, an overlapping area between one horizontal electrode (one of H1-H4) and one gate line GL becomes large.

As a result, as the overlapping area between the horizontal electrodes (H1-H4) corresponding to touch electrodes TE and the gate lines GL increases, parasitic capacitances between the touch electrodes TE and the gate lines GL may become larger, and in turn, this may lead to poor touch sensitivity.

A modified woven-type touch sensor structure capable of reducing parasitic capacitance between touch electrodes TE and gate lines GL while maintaining the benefit of the woven-type touch sensor structure of FIG. 7 is described below.

Figure 8:
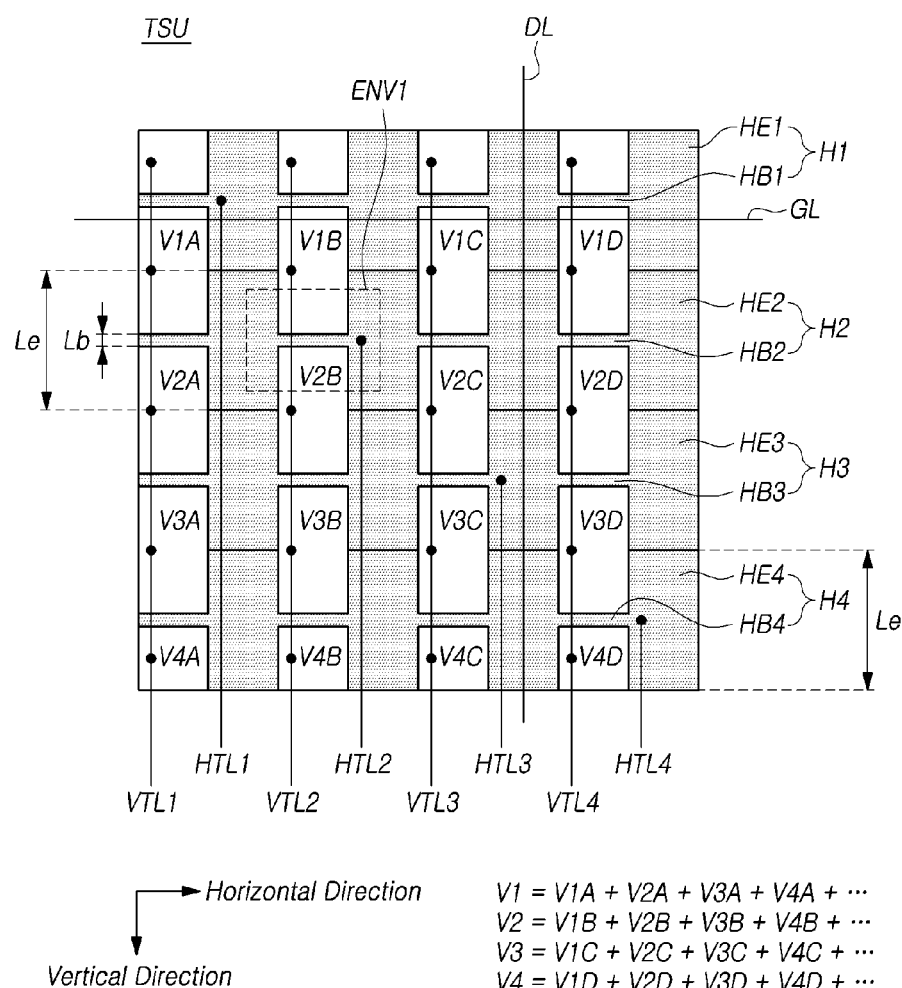
FIG. 8 illustrates an example touch sensor unit in the woven-type touch sensor structure of the touch display device according to aspects of the present disclosure.
Figure 9:
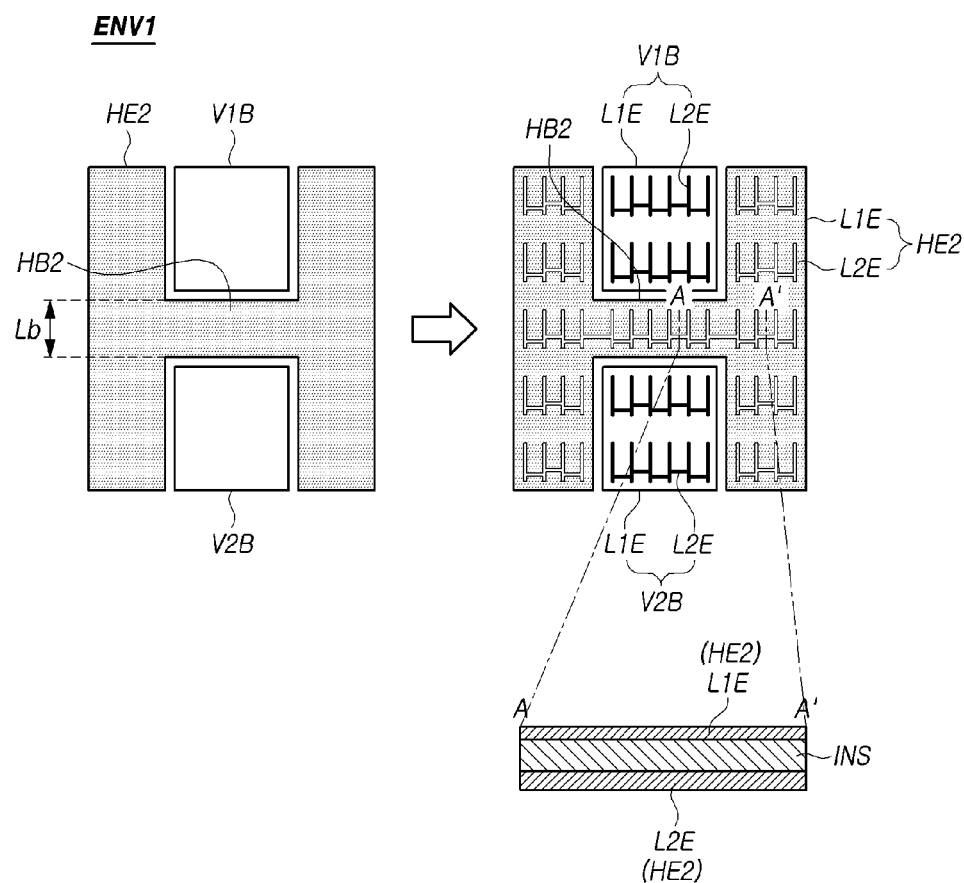
FIG. 9 illustrates an enlargement of a partial area in FIG. 8.

FIG. 8 illustrates an example touch sensor unit TSU in the woven-type touch sensor structure of the touch display device 100 according to aspects of the present disclosure. FIG. 9 illustrates an enlargement of a partial area ENV1 in FIG. 8.

Referring to FIG. 8, a touch sensor unit TSU having the woven-type touch sensor structure according to embodiments of the present disclosure may include a first horizontal electrode H1 including a plurality of first electrode parts HE1 spaced apart from one another in the horizontal direction, and a plurality of first bridge parts HB1 connecting the plurality of first electrode parts HE1, a second horizontal electrode H2 including a plurality of second electrode parts HE2 spaced apart from, or adjacent to, the first horizontal electrode H1 in the vertical direction and spaced apart from one another in the horizontal direction, and a plurality of second bridge parts HB2 connecting the plurality of second electrode part HE2, a third horizontal electrode H3 including a plurality of third electrode parts HE3 spaced apart from, or adjacent to, the second horizontal electrode H2 in the vertical direction and spaced apart from one another in the horizontal direction, and a plurality of third bridge parts HB3 connecting the plurality of third electrode parts HE3, and a fourth horizontal electrode H4 including a plurality of fourth electrode parts HE4 spaced apart from, or adjacent to, the third horizontal electrode H3 in the vertical direction and spaced apart from one another in the horizontal direction, and a plurality of fourth bridge parts HB4 connecting the plurality of fourth electrode parts HE4.

Referring to FIG. 8, the touch sensor unit TSU having the woven-type touch sensor structure according to embodiments of the present disclosure may further include a first horizontal touch line HTL1 electrically connected to the first horizontal electrode H1 and disposed to extend in the vertical direction, a second horizontal touch line HTL2 electrically connected to the second horizontal electrode H2 and disposed to extend in the vertical direction, a third horizontal touch line HTL3 electrically connected to the third horizontal electrode H3 and disposed to extend in the vertical direction, and a fourth horizontal touch line HTL4 electrically connected to the fourth horizontal electrode H4 and disposed to extend in the vertical direction.

Referring to FIG. 8, the touch sensor unit TSU having the woven-type touch sensor structure according to embodiments of the present disclosure may include a plurality of first separation electrodes (V1A, V1B, V1C, and V1D) located between the plurality of first bridge parts HB1 and the plurality of second bridge parts HB2 and spaced apart from one another in the horizontal direction, a plurality of second separation electrodes (V2A, V2B, V2C, and V2D) located between the plurality of second bridge parts HB2 and the plurality of third bridge parts HB3 and spaced apart from one another in the horizontal direction, a plurality of third separation electrodes (V3A, V3B, V3C, and V3D)

located between the plurality of third bridge parts HB3 and the plurality of fourth bridge parts HB4 and spaced apart from one another in the horizontal direction, and a plurality of fourth separation electrodes (V4A, V4B, V4C, and V4D) located under, or adjacent to, each of the plurality of fourth bridge parts HB4 and spaced apart from one another in the horizontal direction.

Referring to FIG. 8, in the woven-type touch sensor structure according to embodiments of the present disclosure, a first vertical electrode V1, a second vertical electrode V2, a third vertical electrode V3, and a fourth vertical electrode V4 can be formed using the separation electrodes (V1A-V1D, V2A-V2D, V3A-V3D, and V4A-V4D).

Referring to FIG. 8, to form the first vertical electrode V1, the second vertical electrode V2, the third vertical electrode V3, and the fourth vertical electrode V4, the touch sensor unit TSU having the woven-type touch sensor structure according to embodiments of the present disclosure may include a first vertical touch line VTL1, a second vertical touch line VTL2, a third vertical touch line VTL3, and a fourth vertical touch line VTL4.

The first vertical touch line VTL1 may electrically connect a first separation electrode V1A disposed in a first column among the plurality of first separation electrodes (V1A, V1B, V1C, and V1D) and a second separation electrode V2A disposed in the first column among the plurality of second separation electrodes (V2A, V2B, V2C, and V2D).

The first separation electrode V1A disposed in the first column, the second separation electrode V2A disposed in the first column, the third separation electrode V3A disposed in the first column, and the fourth separation electrode V4A disposed in the first column may be connected by the first vertical touch line VTL1, and thereby, be included in the first vertical electrode V1.

The second vertical touch line VTL2 may electrically connect a first separation electrode V1B disposed in a second column among the plurality of first separation electrodes (V1A, V1B, V1C, and V1D) and a second separation electrode V2B disposed in the second column among the plurality of second separation electrodes (V2A, V2B, V2C, and V2D).

The first separation electrode V1B disposed in the second column, the second separation electrode V2B disposed in the second column, the third separation electrode V3B disposed in the second column, and the fourth separation electrode V4B disposed in the second column may be connected by the second vertical touch line VTL2, and thereby, be included in the second vertical electrode V2.

The third vertical touch line VTL3 may electrically connect a first separation electrode V1C disposed in a third column among the plurality of first separation electrodes (V1A, V1B, V1C, and V1D) and a second separation electrode V2C disposed in the third column among the plurality of second separation electrodes (V2A, V2B, V2C, and V2D).

The first separation electrode V1C disposed in the third column, the second separation electrode V2C disposed in the third column, the third separation electrode V3C disposed in the third column, and the fourth separation electrode V4C disposed in the third column may be connected by the third vertical touch line VTL3, and thereby, be included in the third vertical electrode V3.

The fourth vertical touch line VTL4 may electrically connect a first separation electrode V1D disposed in a fourth column among the plurality of first separation electrodes (V1A, V1B, V1C, and V1D) and a second separation electrode V2D disposed in the fourth column among the plurality of second separation electrodes (V2A, V2B, V2C, and V2D).

The first separation electrode V1D disposed in the fourth column, the second separation electrode V2D disposed in the fourth column, the third separation electrode V3D disposed in the fourth column, and the fourth separation electrode V4D disposed in the fourth column may be connected by the fourth vertical touch line VTL4, and thereby, be included in the fourth vertical electrode V4.

Referring to FIG. 8, the touch driving circuit 310 may be electrically connected to the first horizontal electrode H1 through the first horizontal touch line HTL1, the second horizontal electrode H2 through the second horizontal touch line HTL2, the third horizontal electrode H3 through the third horizontal touch line HTL3, and the fourth horizontal electrode H4 through the fourth horizontal touch line HTL4.

The touch driving circuit 310 may be electrically connected to the first vertical electrode V1 through the first vertical touch line VTL1, the second vertical electrode V2 through the second vertical touch line VTL2, the third vertical electrode V3 through the third vertical touch line VTL3, and the fourth vertical electrode V4 through the fourth vertical touch line VTL4.

Referring to FIGS. 8 and 9, a length Lb in the vertical direction of each of the plurality of first bridge parts HB1 may be shorter than a length Le in the vertical direction of each of the plurality of first electrode parts HE1. A length Lb in the vertical direction of each of the plurality of second bridge parts HB2 may be shorter than a length Le in the vertical direction of each of the plurality of second electrode parts HE2. A length Lb in the vertical direction of each of the plurality of third bridge parts HB3 may be shorter than a length Le in the vertical direction of each of the plurality of third electrode parts HE3. A length Lb in the vertical direction of each of the plurality of fourth bridge parts HB4 may be shorter than a length Le in the vertical direction of each of the plurality of fourth electrode parts HE4.

An arrangement structure of the first to fourth horizontal touch lines (HTL1-HTL4) is described below.

Referring to FIG. 8, the first horizontal touch line HTL1 may be connected to one of the plurality of first electrode parts HE1 and the plurality of first bridge parts HB1 of the first horizontal electrode H1; the second horizontal touch line HTL2 may be connected to one of the plurality of second electrode parts HE2 and the plurality of second bridge parts HB2 of the second horizontal electrode H2; the third horizontal touch line HTL3 may be connected to one of the plurality of third electrode parts HE3 and the plurality of third bridge part HB3 of the third horizontal electrode H3; and the fourth horizontal touch line HTL4 may be connected to one of the plurality of fourth electrode parts HE4 and the plurality of fourth bridge parts HB4 of the fourth horizontal electrode H4.

Referring to FIG. 8, in one embodiment, the first horizontal touch line HTL1 may be connected to one (a first electrode part HE1 in the first column) of the plurality of first electrode parts HE1 of the first horizontal electrode H1; the second horizontal touch line HTL2 may be connected to one (a second electrode part HE2 in the second column) of the plurality of second electrode parts HE2 of the second horizontal electrode H2; the third horizontal touch line HTL3 may be connected to one (a third electrode part HE3 in the third column) of the plurality of third electrode parts HE3 of the third horizontal electrode H3; and the fourth horizontal touch line HTL4 may be connected to one (a fourth electrode part HE4 in the fourth column) of the plurality of fourth electrode parts HE4 of the fourth horizontal electrode H4.

In another embodiment, the first horizontal touch line HTL1 may be connected to one (a first bridge part BE1 in the first column) of the plurality of first bridge parts BE1 of the first horizontal electrode H1; the second horizontal touch line HTL2 may be connected to one (a second bridge part BE2 in the second column) of the plurality of second bridge parts BE2 of the second horizontal electrode H2; the third horizontal touch line HTL3 may be connected to one (a third bridge part BE3 in the third column) of the plurality of third bridge parts BE3 of the third horizontal electrode H3; and the fourth horizontal touch line HTL4 may be connected to one (a fourth bridge part BE4 in the fourth column) of the plurality of fourth bridge parts BE4 of the fourth horizontal electrode H4.

Referring to FIG. 8, the first horizontal touch line HTL1 may overlap a first electrode part HE1 disposed in the first column of the plurality of first electrode parts HE1 of the first horizontal electrode H1, a second electrode part HE2 disposed in the first column of the plurality of second electrode parts HE2 of the second horizontal electrode H2, a third electrode part HE3 in the first column of the plurality of third electrode parts HE3 of the third horizontal electrode H3; and a fourth electrode part HE4 disposed in the first column of the plurality of fourth electrode parts HE4 of the fourth horizontal electrode H4.

The second horizontal touch line HTL2 may overlap a second electrode part HE2 disposed in the second column of the plurality of second electrode parts HE2 of the second horizontal electrode H2, a third electrode part HE3 in the second column of the plurality of third electrode parts HE3 of the third horizontal electrode H3; and a fourth electrode part HE4 disposed in the second column of the plurality of fourth electrode parts HE4 of the fourth horizontal electrode H4.

The third horizontal touch line HTL3 may overlap a third electrode part HE3 in the third column of the plurality of third electrode parts HE3 of the third horizontal electrode H3; and a fourth electrode part HE4 disposed in the third column of the plurality of fourth electrode parts HE4 of the fourth horizontal electrode H4.

The fourth horizontal touch line HTL4 may overlap a fourth electrode part HE4 disposed in the fourth column of the plurality of fourth electrode parts HE4 of the fourth horizontal electrode H4.

Referring to FIG. 8, the first separation electrode V1B disposed in the second column and the second separation electrode V2B disposed in the second column may be disposed between the first horizontal touch line HTL1 and the second horizontal touch line HTL2 (or a line in which the second horizontal touch line HTL2 runs).

As shown in FIG. 8, the first to fourth horizontal touch lines (HTL1-HLT4) may be disposed only up to points connected with the first to fourth horizontal electrodes (H1-H4). In another embodiment, the first to fourth horizontal touch lines (HTL1-HLT4) may extend up to an upper end, or an upper edge, of the touch sensor unit TSU or an upper end, or an upper edge, of the touch panel TSP running beyond points connected with the first to fourth horizontal electrodes (H1-H4). For example, the third separation electrode V3C and the fourth separation electrode V4C disposed in the third column may be disposed between the second horizontal touch line HTL2 and the third horizontal touch line HTL3. The first separation electrode V1C and the second separation electrode V2C disposed in the third column may be also disposed between a line in which the second horizontal touch line HTL2 runs and a line in which the third horizontal touch line HTL3 runs.

The first separation electrode V1D disposed in the fourth column and the second separation electrode V2D disposed in the fourth column may be disposed between a line in which the third horizontal touch line HTL3 runs and a line in which the fourth horizontal touch line HTL4 runs.

An arrangement structure of the first to fourth vertical touch lines (VTL1-VTL4) is described below.

Referring to FIG. 8, the first vertical touch line VTL1 may overlap the first separation electrode V1A disposed in the first column among the plurality of first separation electrodes (V1A, V1B, V1C, and V1D), and overlap the second separation electrode V2A disposed in the first column among the plurality of second separation electrodes (V2A, V2B, V2C, and V2D).

The first vertical touch line VTL1 may overlap the second bridge part HB2 of the second horizontal electrode H2 located between the first separation electrode V1A disposed in the first column and the second separation electrode V2A disposed in the first column.

The second vertical touch line VTL2 may overlap the first separation electrode V1B disposed in the second column among the plurality of first separation electrodes (V1A, V1B, V1C, and V1D), and overlap the second separation electrode V2B disposed in the second column among the plurality of second separation electrodes (V2A, V2B, V2C, and V2D).

The second vertical touch line VTL2 may overlap the second bridge part HB2 of the second horizontal electrode H2 located between the first separation electrode V1B disposed in the second column and the second separation electrode V2B disposed in the second column.

The third vertical touch line VTL3 may overlap the first separation electrode V1C disposed in the third column among the plurality of first separation electrodes (V1A, V1B, V1C, and V1D), and overlap the second separation electrode V2C disposed in the third column among the plurality of second separation electrodes (V2A, V2B, V2C, and V2D).

The third vertical touch line VTL3 may overlap the second bridge part HB2 of the second horizontal electrode H2 located between the first separation electrode V1C disposed in the third column and the second separation electrode V2C disposed in the third column.

The fourth vertical touch line VTL4 may overlap the first separation electrode V1D disposed in the fourth column among the plurality of first separation electrodes (V1A, V1B, V1C, and V1D), and overlap the second separation electrode V2D disposed in the fourth column among the plurality of second separation electrodes (V2A, V2B, V2C, and V2D).

The fourth vertical touch line VTL4 may overlap the second bridge part HB2 of the second horizontal electrode H2 located between the first separation electrode V1D disposed in the fourth column and the second separation electrode V2D disposed in the fourth column.

Referring to FIG. 8, a plurality of gate lines GL are signal lines for carrying gate signals to the plurality of sub-pixels SP for display driving, and are spaced apart from one another in the vertical direction. Each of the plurality of gate lines GL may be disposed to extend in the horizontal direction.

In the case of the woven-type touch sensor structure of FIG. 8, due to the shape of each of first to fourth horizontal electrodes (H1-H4), an area in which the first to fourth horizontal electrodes (H1-H4) overlap the gate lines GL can be reduced.

For example, the plurality of gate lines GL may include a gate line GL that does not overlap the plurality of first bridge parts HB1 of the first horizontal electrode H1, while overlapping only the plurality of first electrode parts HE1 of the first horizontal electrode HE As such a gate line GL does not overlap the plurality of first bridge parts HB1 of the first horizontal electrode H1, an area overlapping the first horizontal electrode H1 can be reduced.

As a consequence, parasitic capacitances between the first to fourth horizontal electrodes (H1-H4) and the gate lines GL can be reduced.

In the case of the woven-type touch sensor structure of FIG. 8, as each of the first to fourth vertical electrodes (V1-V4) includes a plurality of separate electrodes, the number of gate lines GL overlapping each of the first to fourth vertical electrodes (V1-V4) can be reduced.

As a consequence, parasitic capacitances between the first to fourth vertical electrodes (V1-V4) and the gate lines GL can be reduced.

As described above, in the case of the woven-type touch sensor structure of FIG. 8, since parasitic capacitances between the first to fourth horizontal electrodes (H1-H4) and the gate lines GL can be reduced, and parasitic capacitances between the first to fourth vertical electrodes (V1-V4) and the gate lines GL can be reduced, touch sensitivity can be significantly improved.

Referring to FIG. 8, a plurality of data lines DL are signal lines for carrying image signals to the plurality of sub-pixels SP for display driving, and are spaced apart from one another in the horizontal direction. Each of the plurality of data lines DL may extend in the vertical direction.

The first horizontal touch line HTL1, the second horizontal touch line HTL2, the third horizontal touch line HTL3, the first vertical touch line VTL1, the second vertical touch line VTL2, and the like may be disposed parallel to the plurality of data lines DL. The fourth horizontal touch line HTL4, the third vertical touch line VTL3, and the fourth vertical touch line VTL4 may also be disposed parallel to the plurality of data lines DL.

In the case of the woven-type touch sensor structure of FIG. 8, at least one of the first to fourth horizontal electrodes (H1-H4) does not overlap all of one data line DL. As a consequence, parasitic capacitances between the first to fourth horizontal electrodes (H1-H4) and the data lines DL can be reduced.

In the case of the woven-type touch sensor structure of FIG. 8, as each of the first to fourth vertical electrodes (V1-V4) includes the plurality of separate electrodes, an area in which each of the first to fourth vertical electrodes (V1-V4) overlaps one data line DL can be reduced. As a consequence, parasitic capacitances between the first to fourth vertical electrodes (V1-V4) and the data line DL can be reduced.

As described above, in the case of the woven-type touch sensor structure of FIG. 8, as parasitic capacitances between the touch electrodes (H1-H4, and V1-V4) and the display driving wires (GL and DL) can be reduced, therefore, touch sensitivity can be significantly improved.

In the woven-type touch sensor structure according to embodiments of the present disclosure, each of the first horizontal electrode H1, the second horizontal electrode H2, the third horizontal electrode H3, and the plurality of first separation electrodes (V1A, V1B, V1C, and V1D) and the plurality of second separation electrodes (V2A, V2B, V2C, and V2D) may be formed such that one or more first layer electrodes LIE and one or more second layer electrodes L2E are located in different layers and electrically connected.

Referring to FIG. 9, each of the second electrode part HE2 of the second horizontal electrode H2, the second bridge part HB2 of the second horizontal electrode H2, the first separation electrode V1B disposed in the second column, and the second separation electrode V2B disposed in the second column may include a first layer electrode LIE and a second layer electrode L2E that are electrically separated by an insulating layer INS.

In this regard, even when each of the second electrode part HE2 and the second bridge part HB2 of the second horizontal electrode H2 includes the first layer electrode LIE and the second layer electrode L2E located in different layers, the first layer electrode LIE and the second layer electrode L2E included in each of the second electrode part HE2 and the second bridge part HB2 of the second horizontal electrode H2 in an area of the second horizontal electrode H2 may be electrically connected to each other through a contact hole of the insulating layer INS at at least one point.

Even when each of the first separation electrode V1B disposed in the second column and the second separation electrode V2B disposed in the second column, which are separation electrodes included in the second vertical electrode V2, includes the first layer electrode LIE and the second layer electrode L2E located in different layers, the first layer electrode LIE and the second layer electrode L2E included in the first separation electrode V1B in an area of the first separation electrode V1B disposed in the second column may be electrically connected through a contact hole of the insulating layer INS at at least one point, and the first layer electrode LIE and the second layer electrode L2E included in the second separation electrode V2B in an area of the second separation electrode V2B disposed in the second column may be electrically connected through a contact hole of the insulating layer INS at at least one point. The contact structure in the electrode area of the first and second layer electrodes LIE and L2E described above may be substantially equally applied to FIGS. 11, 13, and 15.

Meanwhile, the second layer electrode L2E included in the second electrode part HE2 and the second bridge part HB2 included in the second horizontal electrode H2, and the second layer electrode L2E included in the first separation electrode V1B and the second separation electrode V2B included in the second vertical electrode V2 may be formed of the same material and located in the same layer; for distinguishing from each other in drawings and convenience of description, they are shown in different colors (brightness) in FIG. 9. Such a representation for the second layer electrode L2E in the drawings is equally applied to FIGS. 11, 13, and 15 below.

For example, the first layer electrode LIE may include the same material as a pixel electrode disposed in a sub-pixel SP. The second layer electrode L2E may include the same material as a gate line GL or the gate electrode of a transistor in the sub-pixel SP.

Figure 10:
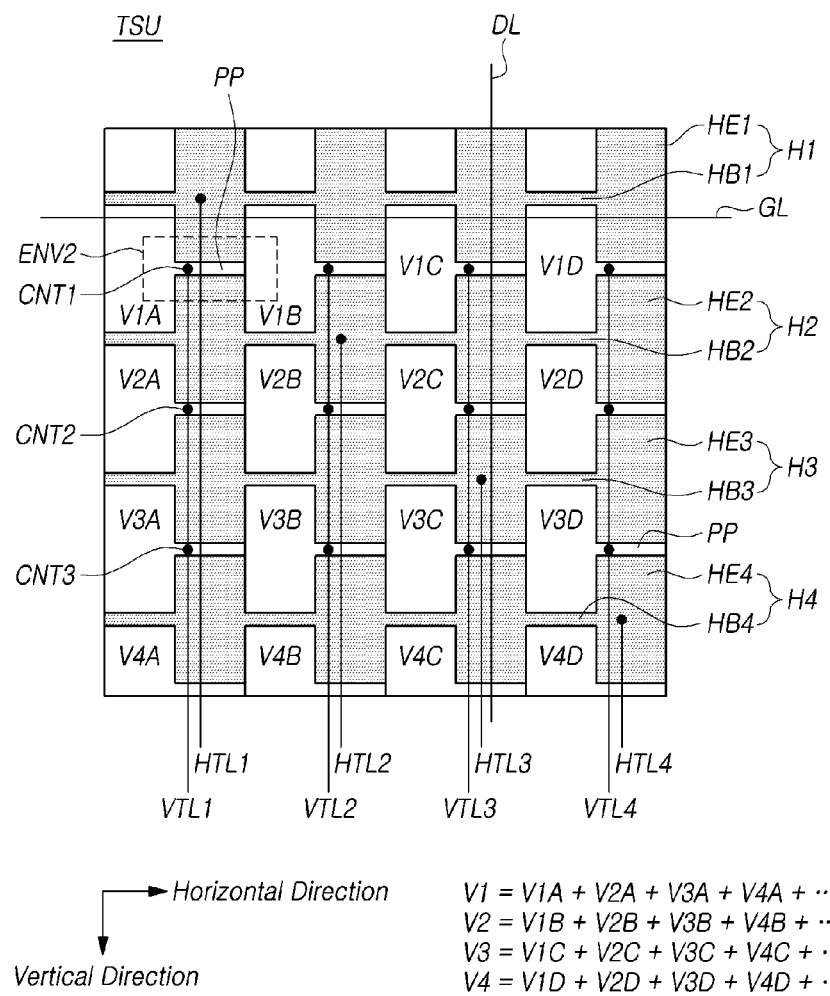
FIG. 10 illustrates an example touch sensor unit in the woven-type touch sensor structure of the touch display device according to aspects of the present disclosure.
Figure 11:
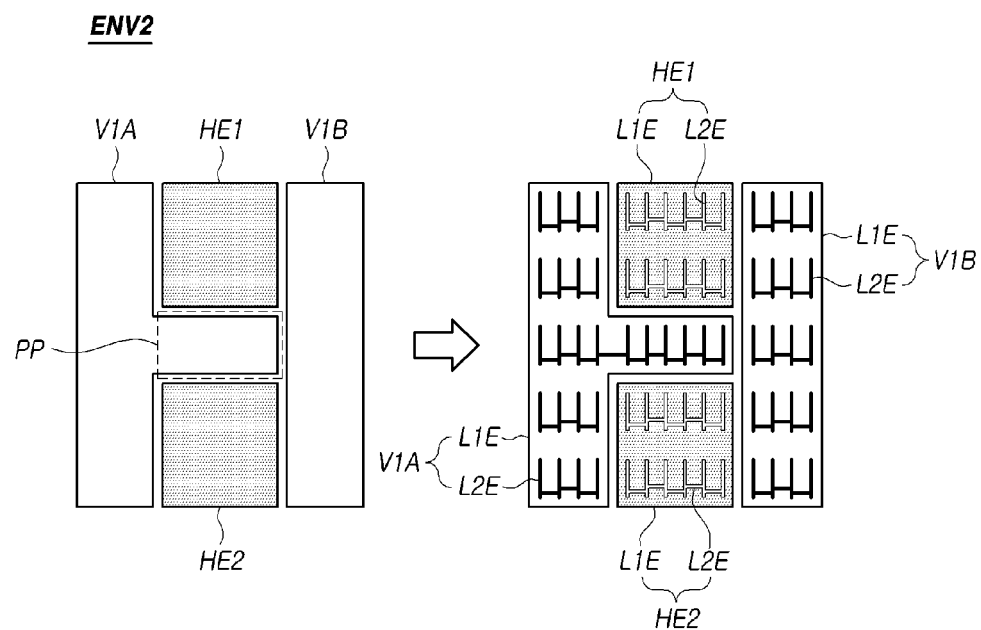
FIG. 11 illustrates an enlargement of a partial area in FIG. 10.

FIG. 10 illustrates an example touch sensor unit TSU in the woven-type touch sensor structure of the touch display device 100 according to aspects of the present disclosure. FIG. 11 illustrates an enlargement of a partial area ENV2 in FIG. 10.

The woven-type touch sensor structure shown in FIG. 10 is obtained by changing some configurations in the touch sensor structure of FIG. 8. Taking account of such a similarity, discussions will be conducted by focusing on configurations that are different from the touch sensor structure of FIG. 8 mainly described.

Referring to FIG. 10, in the touch sensor unit TSU having the woven-type touch sensor structure according to embodiments of the present disclosure, each of a plurality of first separation electrodes (V1A, V1B, V1C, and V1D), a plurality of second separation electrodes (V2A, V2B, V2C, and V2D), and a plurality of third separation electrodes (V3A, V3B, V3C, and V3D) may have a protrusion structure.

For example, a first separation electrode V1A disposed in a first column may include a first protrusion part PP interposed between a first electrode part HE1 and a second electrode part HE2 disposed in the same column. For example, a second separation electrode V2A disposed in the first column may include a second protrusion part PP interposed between the second electrode part HE2 and a third electrode part HE3 disposed in the same column. For example, a third separation electrode V3A disposed in the first column may include a third protrusion part PP interposed between the third electrode part HE3 and a fourth electrode part HE4 disposed in the same column.

As such a protrusion structure is employed, first to fourth vertical touch lines (VTL1-VTL4) may have a changed arrangement structure as follows.

Referring to FIG. 10, first to fourth vertical touch lines (VTL1-VTL4) can be connected to protrusion parts PP formed in first to fourth separation electrodes (V1A-V1D, V2A-V2D, V3A-V3D, and V4A-V4D).

More specifically, the first vertical touch line VTL1 can electrically connect the protrusion parts PP of the separation electrodes (VIA, V2A, V3A, and V4A) disposed in the first column to one another. The second vertical touch line VTL2 can electrically connect the protrusion parts PP of the separation electrodes (V1B, V2B, V3B, and V4B) disposed in a second column to one another. The third vertical touch line VTL3 can electrically connect the protrusion parts PP of the separation electrodes (V1C, V2C, V3C, and V4C) disposed in a third column to one another. The fourth vertical touch line VTL4 can electrically connect the protrusion parts PP of the separation electrodes (V1D, V2D, V3D, and V4D) disposed in a fourth column to one another.

Referring to FIG. 10, the touch sensor unit TSU of the woven-type touch sensor structure according to embodiments of the present disclosure may include a first contact hole CNT1 through which the first protrusion part PP of the first separation electrode VIA disposed in the first column and the first vertical touch line VTL1 are connected, a second contact hole CNT2 through which the second protrusion part PP of the second separation electrode V2A disposed in the first column and the first vertical touch line VTL1 are connected, and a third contact hole CNT3 through which the third protrusion part PP of the third separation electrode V3A disposed in the first column and the first vertical touch line VTL1 are connected.

The touch sensor unit TSU of the woven-type touch sensor structure according to embodiments of the present disclosure may include a first contact hole CNT1 through which the first protrusion part PP of the first separation electrode V1B disposed in the second column and the second vertical touch line VTL2 are connected, a second contact hole CNT2 through which the second protrusion part PP of the second separation electrode V2B disposed in the second column and the second vertical touch line VTL2 are connected, and a third contact hole CNT3 through which the third protrusion part PP of the third separation electrode V3B disposed in the second column and the second vertical touch line VTL2 are connected.

The touch sensor unit TSU of the woven-type touch sensor structure according to embodiments of the present disclosure may include a first contact hole CNT1 through which the first protrusion part PP of the first separation electrode V1C disposed in the third column and the third vertical touch line VTL3 are connected, a second contact hole CNT2 through which the second protrusion part PP of the second separation electrode V2C disposed in the third column and the third vertical touch line VTL3 are connected, and a third contact hole CNT3 through which the third protrusion part PP of the third separation electrode V3C disposed in the third column and the third vertical touch line VTL3 are connected.

The touch sensor unit TSU of the woven-type touch sensor structure according to embodiments of the present disclosure may include a first contact hole CNT1 through which the first protrusion part PP of the first separation electrode V1D disposed in the fourth column and the fourth vertical touch line VTL4 are connected, a second contact hole CNT2 through which the second protrusion part PP of the second separation electrode V2D disposed in the fourth column and the fourth vertical touch line VTL4 are connected, and a third contact hole CNT3 through which the third protrusion part PP of the third separation electrode V3D disposed in the fourth column and the fourth vertical touch line VTL4 are connected.

Referring to FIG. 10, in the touch sensor unit TSU having the woven-type touch sensor structure according to embodiments of the present disclosure, the first vertical touch line VTL1 may overlap the second electrode part HE2 and the third electrode part HE3, which are disposed in the same column, and not overlap a first bridge part HB1, a second bridge part HB2, and a third bridge part HB3, which are disposed in the same column.

The first vertical touch line VTL1 may overlap the second electrode part HE2, the third electrode part HE3, and the fourth electrode part HE4, which are disposed in the same column, and be electrically separated from the overlapping second to fourth electrode parts (HE2, HE3, and HE4).

In this situation, a first horizontal touch line HTL1 may overlap the second electrode part HE2, the third electrode part HE3, and the fourth electrode part HE4, which overlap the first vertical touch line VTL1, as well as the first electrode part HE1. The first horizontal touch line HTL1 may be electrically separated from the second electrode part HE2, the third electrode part HE3, and the fourth electrode part HE4, which overlap the first vertical touch line VTL1, while being electrically connected to the first electrode part HE1.

In another embodiment, the first vertical touch line VTL1 may overlap the first electrode part HE1, the second electrode part HE2, the third electrode part HE3, and the fourth electrode part HE4, which are disposed in the same column, and be electrically separated from the overlapping first to fourth electrode parts (HE1, HE2, HE3, and HE4).

In this situation, the first horizontal touch line HTL1 may overlap the first electrode part HE1, the second electrode part HE2, the third electrode part HE3, and the fourth electrode part HE4, which overlap the first vertical touch line VTL1. The first horizontal touch line HTL1 may be electrically connected with the first electrode part HE1 of the first electrode part HE1, the second electrode part HE2, the third electrode part HE3, and the fourth electrode part HE4, which overlap the first vertical touch line VTL1, and be electrically separated from the second electrode part HE2, the third electrode part HE3, and the fourth electrode part HE4.

In the touch sensor unit TSU having the woven-type touch sensor structure according to embodiments of the present disclosure, the second vertical touch line VTL2 may overlap the second electrode part HE2 and the third electrode part HE3, which are disposed in the same column, and not overlap the first bridge part HB1, the second bridge part HB2, and the third bridge part HB3, which are disposed in the same column.

The second vertical touch line VTL2 may overlap the second electrode part HE2, the third electrode part HE3, and the fourth electrode part HE4, which are disposed in the same column, and be electrically separated from the overlapping second to fourth electrode parts (HE2, HE3, and HE4).

In this situation, a second horizontal touch line HTL2 may overlap the third electrode part HE3 and the fourth electrode part HE4, which overlap the second vertical touch line VTL2, as well as the second electrode part HE2. The second horizontal touch line HTL2 may be electrically separated from the third electrode part HE3 and the fourth electrode part HE4, which overlap the first vertical touch line VTL1, while being electrically connected to the second electrode part HE2.

In another embodiment, the second vertical touch line VTL2 may overlap the first electrode part HE1, the second electrode part HE2, the third electrode part HE3, and the fourth electrode part HE4, which are disposed in the same column, and be electrically separated from the overlapping first to fourth electrode parts (HE1, HE2, HE3, and HE4).

In this situation, the second horizontal touch line HTL2 may overlap the first electrode part HE1, the second electrode part HE2, the third electrode part HE3, and the fourth electrode part HE4, which overlap the second vertical touch line VTL2. The second horizontal touch line HTL2 may be electrically connected with the second electrode part HE2 of the first electrode part HE1, the second electrode part HE2, the third electrode part HE3, and the fourth electrode part HE4, which overlap the second vertical touch line VTL2, and be electrically separated from the first electrode part HE1, the third electrode part HE3, and the fourth electrode part HE4.

In the touch sensor unit TSU having the woven-type touch sensor structure according to embodiments of the present disclosure, the third vertical touch line VTL3 may overlap the second electrode part HE2 and the third electrode part HE3, which are disposed in the same column, and not overlap the first bridge part HB1, the second bridge part HB2, and the third bridge part HB3, which are disposed in the same column.

The third vertical touch line VTL3 may overlap the second electrode part HE2, the third electrode part HE3, and the fourth electrode part HE4, which are disposed in the same column, and be electrically separated from the overlapping second to fourth electrode parts (HE2, HE3, and HE4).

In this situation, a third horizontal touch line HTL3 may overlap the fourth electrode part HE4 overlapping the third vertical touch line VTL3, as well as the third electrode part HE3. The third horizontal touch line HTL3 may be electrically separated from the fourth electrode part HE4 overlapping the third vertical touch line VTL3, while being electrically connected to the third electrode part HE3.

In another embodiment, the third vertical touch line VTL3 may overlap the first electrode part HE1, the second electrode part HE2, the third electrode part HE3, and the fourth electrode part HE4, which are disposed in the same column, and be electrically separated from the overlapping first to fourth electrode parts (HE1, HE2, HE3, and HE4).

In this situation, the third horizontal touch line HTL3 may overlap the first electrode part HE1, the second electrode part HE2, the third electrode part HE3, and the fourth electrode part HE4, which overlap the third vertical touch line VTL3. The third horizontal touch line HTL3 may be electrically connected with the third electrode part HE3 of the first electrode part HE1, the second electrode part HE2, the third electrode part HE3, and the fourth electrode part HE4, which overlap the third vertical touch line VTL3, and be electrically separated from the first electrode part HE1, the second electrode part HE2, and the fourth electrode part HE4.

In the touch sensor unit TSU having the woven-type touch sensor structure according to embodiments of the present disclosure, the fourth vertical touch line VTL4 may overlap the second electrode part HE2 and the third electrode part HE3, which are disposed in the same column, and not overlap the first bridge part HB1, the second bridge part HB2, and the third bridge part HB3, which are disposed in the same column.

The area of the first protrusion part PP of the first separation electrode V1A included in the first vertical electrode V1 may be substantially, or nearly, the same as the area of the first bridge part HB1 of the first horizontal electrode H1.

Accordingly, an area of each of the first to fourth horizontal electrodes (H1-H4) may be substantially, or nearly, the same as an area of each of the first to fourth vertical electrodes (V1-V4). As a result, the degradation of touch sensitivity due to a difference in electrode areas can be prevented.

In the woven-type touch sensor structure of FIG. 10, similarly or nearly equally to the woven-type touch sensor structure of FIG. 8, parasitic capacitances between the touch electrodes (H1-H4, and V1-V4) and the display driving lines (GL and DL) can be reduced, and thereby, touch sensitivity can be improved.

Further, in the woven-type touch sensor structure of FIG. 10, a difference between an area of each of the first to fourth horizontal electrodes (H1-H4) and an area of each of the first to fourth vertical electrodes (V1-V4) can be reduced, and thereby, touch sensitivity can be more improved.

Meanwhile, in the woven-type touch sensor structure of FIG. 10, the first to fourth vertical touch lines (VTL1-VTL4) may be connected to protrusion parts PP formed in first to fourth separation electrodes (V1A-V1D, V2A-V2D, V3A-V3D, and V4A-V4D).

Accordingly, the first to fourth vertical touch lines (VTL1-VTL4) may be disposed to overlap the first to fourth horizontal electrodes (H1-H4). The first to fourth horizontal touch lines (HTL1-HTL4) may be also disposed to overlap the first to fourth horizontal electrodes (H1-H4).

Referring to FIG. 11, each of the first electrode part HE1 of the first horizontal electrode H1, the second electrode part HE2 of the second horizontal electrode H2, the first separation electrode V1A disposed in the first column, and the first separation electrode V1B in the second column may include a first layer electrode L1E and a second layer electrode L2E that are electrically separated by an insulating layer INS.

Referring to FIG. 11, the first protrusion part PP of the first separation electrode V1A disposed in the first column may also include a first layer electrode L1E and a second layer electrode L2E.

For example, the first layer electrode L1E may include the same material as a pixel electrode disposed in a sub-pixel SP. The second layer electrode L2E may include the same material as a gate line GL or the gate electrode of a transistor in the sub-pixel SP.

Figure 12:
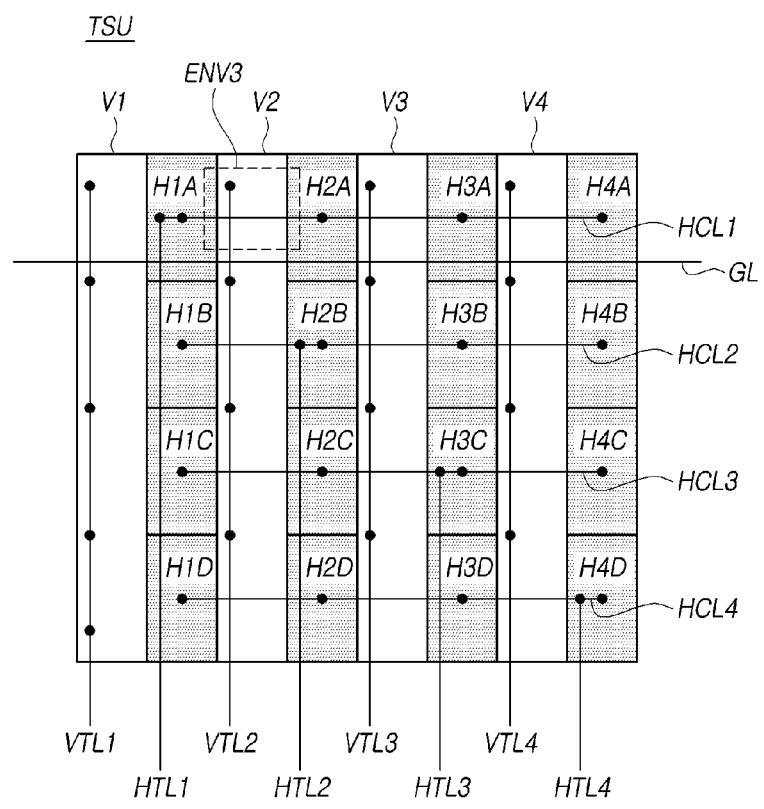
FIG. 12 illustrates an example touch sensor unit in the woven-type touch sensor structure of the touch display device according to aspects of the present disclosure.
Figure 13:
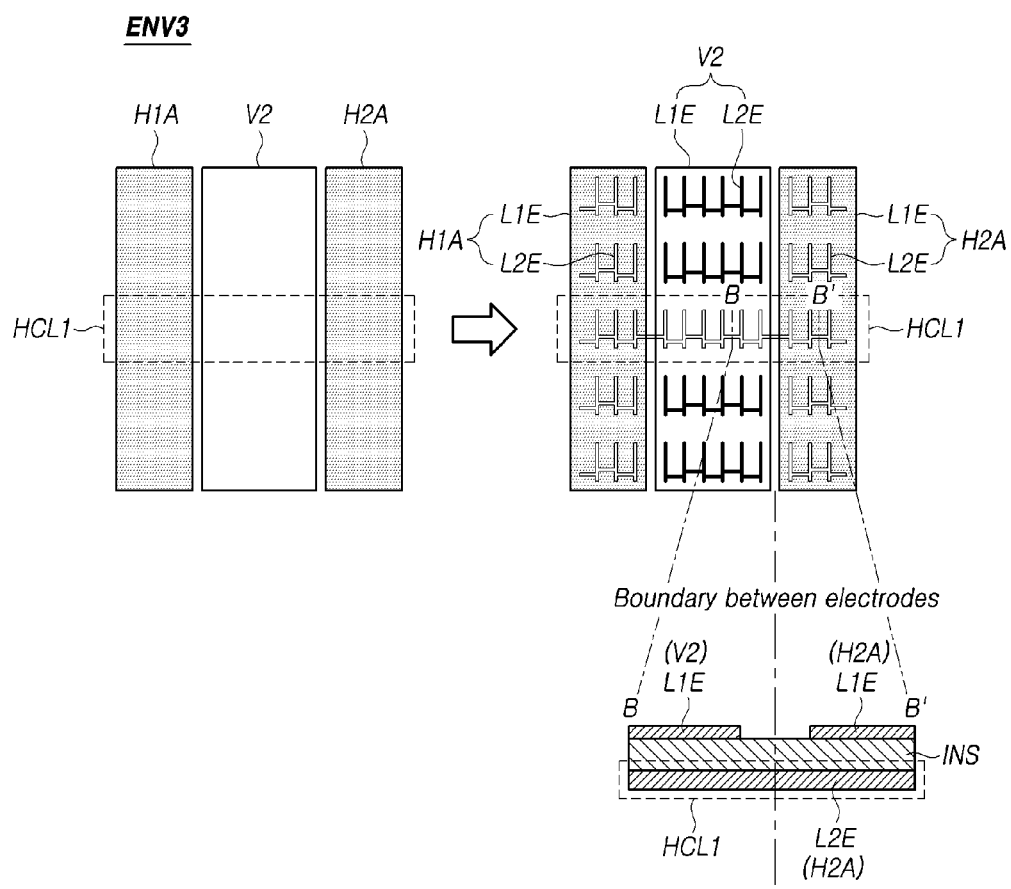
FIG. 13 illustrates an enlargement of a partial area in FIG. 12.

FIG. 12 illustrates an example touch sensor unit TSU in the woven-type touch sensor structure of the touch display device 100 according to aspects of the present disclosure. FIG. 13 illustrates an enlargement of a partial area ENV3 in FIG. 12.

Referring to FIG. 12, a touch sensor unit TSU having the woven-type touch sensor structure according to embodiments of the present disclosure may include a first vertical electrode V1 disposed to extend in the vertical direction, a second vertical electrode V2 spaced apart from the first vertical electrode V1 in the horizontal direction and disposed to extend in the vertical direction, a third vertical electrode V3 spaced apart from the second vertical electrode V2 in the horizontal direction and disposed to extend in the vertical direction, and a fourth vertical electrode V4 spaced apart from the third vertical electrode V3 in the horizontal direction and disposed to extend in the vertical direction.

Referring to FIG. 12, the touch sensor unit TSU having the woven-type touch sensor structure may include a first vertical touch line VTL1 electrically connected to the first vertical electrode V1 and disposed to extend in the vertical direction, a second vertical touch line VTL2 electrically connected to the second vertical electrode V2 and disposed to extend in the vertical direction, a third vertical touch line VTL3 electrically connected to the third vertical electrode V3 and disposed to extend in the vertical direction, and a fourth vertical touch line VTL4 electrically connected to the fourth vertical electrode V4 and disposed to extend in the vertical direction.

Referring to FIG. 12, the touch sensor unit TSU having the woven-type touch sensor structure may include a plurality of first separation electrodes (H1A, H1B, H1C, and H1D) located between the first vertical electrode V1 and the second vertical electrode V2 and spaced apart from one another in the vertical direction, a plurality of second separation electrodes (H2A, H2B, H2C, and H2D) located between the second vertical electrode V2 and the third vertical electrode V3 and spaced apart from one another in the vertical direction, a plurality of third separation electrodes (H3A, H3B, H3C, and H3D) located between the third vertical electrode V3 and the fourth vertical electrode V4 and spaced apart from one another in the vertical direction, and a plurality of fourth separation electrodes (H4A, H4B, H4C, and H4D) located adjacent to the fourth vertical electrode V4 in the horizontal direction and spaced apart from one another in the vertical direction.

Referring to FIG. 12, in the woven-type touch sensor structure according to embodiments of the present disclosure, a first horizontal electrode H1, a second horizontal electrode H2, a third horizontal electrode H3, and a fourth horizontal electrode H4 can be formed using the separation electrodes (H1A-H1D, H2A-H2D, H3A-H3D, and H4A-H4D).

Referring to FIG. 12, to form the first horizontal electrode H1, the second horizontal electrode H2, the third horizontal electrode H3, and the fourth horizontal electrode H4, the touch sensor unit TSU of the woven-type touch sensor structure according to embodiments of the present disclosure may include a first horizontal connection line HCL1, a second horizontal connection line HCL2, a third horizontal connection line HLC3, and a fourth horizontal connection line HCL4.

The first horizontal connection line HCL1 can electrically connect a first separation electrode H1A disposed in a first row among the plurality of first separation electrodes (H1A, H1B, H1C, and H1D), a second separation electrode H2A disposed in the first row among the plurality of second separation electrodes (H2A, H2B, H2C, and H2D), a third separation electrode H3A disposed in the first row among the plurality of third separation electrodes (H3A, H3B, H3C, and H3D), and a fourth separation electrode H4A disposed in the first row among the plurality of fourth separation electrodes (H4A, H4B, H4C, and H4D).

The first separation electrode H1A disposed in the first row, the second separation electrode H2A disposed in the first row, the third separation electrode H3A disposed in the first row, and the fourth separation electrode H4A disposed in the first row may be electrically connected by the first horizontal connection line HCL1, and thereby, be included in the first horizontal electrode H1.

The second horizontal connection line HCL2 can electrically connect a first separation electrode H1B disposed in a second row among the plurality of first separation electrodes (H1A, H1B, H1C, and H1D), a second separation electrode H2B disposed in the second row among the plurality of second separation electrodes (H2A, H2B, H2C, and H2D), a third separation electrode H3B disposed in the second row among the plurality of third separation electrodes (H3A, H3B, H3C, and H3D), and a fourth separation electrode H4B disposed in the second row among the plurality of fourth separation electrodes (H4A, H4B, H4C, and H4D).

The first separation electrode H1B disposed in the second row, the second separation electrode H2B disposed in the second row, the third separation electrode H3B disposed in the second row, and the fourth separation electrode H4B disposed in the second row may be electrically connected by the second horizontal connection line HCL2, and thereby, be included in the second horizontal electrode H2.

The third horizontal connection line HCL3 can electrically connect a first separation electrode H1C disposed in a third row among the plurality of first separation electrodes (H1A, H1B, H1C, and H1D), a second separation electrode H2C disposed in the third row among the plurality of second separation electrodes (H2A, H2B, H2C, and H2D), a third separation electrode H3C disposed in the third row among the plurality of third separation electrodes (H3A, H3B, H3C, and H3D), and a fourth separation electrode H4C disposed in the third row among the plurality of fourth separation electrodes (H4A, H4B, H4C, and H4D).

The first separation electrode H1C disposed in the third row, the second separation electrode H2C disposed in the third row, the third separation electrode H3C disposed in the third row, and the fourth separation electrode H4C disposed in the third row may be electrically connected by the third horizontal connection line HCL3, and thereby, be included in the third horizontal electrode H3.

The fourth horizontal connection line HCL4 can electrically connect a first separation electrode H1D disposed in a fourth row among the plurality of first separation electrodes (H1A, H1B, H1C, and H1D), a second separation electrode H2D disposed in the fourth row among the plurality of second separation electrodes (H2A, H2B, H2C, and H2D), a third separation electrode H3D disposed in the fourth row among the plurality of third separation electrodes (H3A, H3B, H3C, and H3D), and a fourth separation electrode H4D disposed in the fourth row among the plurality of fourth separation electrodes (H4A, H4B, H4C, and H4D).

The first separation electrode H1D disposed in the fourth row, the second separation electrode H2D disposed in the fourth row, the third separation electrode H3D disposed in the fourth row, and the fourth separation electrode H4D disposed in the fourth row may be electrically connected by the fourth horizontal connection line HCL4, and thereby, be included in the fourth horizontal electrode H4.

Referring to FIG. 12, to electrically connect the first to fourth horizontal electrodes (H1-H4) with the touch driving circuit 310, the touch sensor unit TSU having the woven-type touch sensor structure according to embodiments of the present disclosure may include a first horizontal touch line HTL1 electrically connected to the first horizontal connection line HCL1 and disposed to extend in the vertical direction, a second horizontal touch line HTL2 electrically connected to the second horizontal connection line HCL2 and disposed to extend in the vertical direction, a third horizontal touch line HTL3 electrically connected to the third horizontal connection line HCL3 and disposed to extend in the vertical direction, and a fourth horizontal touch line HTL4 electrically connected to the fourth horizontal connection line HCL4 and disposed to extend in the vertical direction.

Referring to FIG. 12, the first vertical touch line VTL1, the second vertical touch line VTL2, the third vertical touch line VTL3, and the fourth vertical touch line VTL4 may be disposed parallel to data lines DL disposed in the vertical direction.

The first horizontal touch line HTL1, the second horizontal touch line HTL2, the third horizontal touch line HTL3, and the fourth horizontal touch line HTL4 may be disposed parallel to the data lines DL.

The first horizontal connection line HCL1, the second horizontal connection line HCL2, the third horizontal connection line HCL3, and the fourth horizontal connection line HCL4 may be disposed to cross the data lines DL.

Referring to FIG. 12, gate lines GL may be disposed to extend in the horizontal direction, and disposed parallel to the first horizontal connection line HCL1, the second horizontal connection line HCL2, the third horizontal connection line HCL3, and the fourth horizontal connection line HCL4.

In one touch sensor unit TSU, one gate line GL may run across all of the first vertical electrode V1, the first separation electrode H1A, the second vertical electrode V2, the second separation electrode H2A, the third vertical electrode V3, the third separation electrode H3A, the fourth vertical electrode V4, and the fourth separation electrode H4A.

In one touch sensor unit TSU, one gate line GL may overlap four vertical electrodes (V1-V4) and four separate electrodes (H1A, H2A, H3A, and H4A). Accordingly, an overlapping area between one gate line GL and one electrode (one of V1, V2, V3, V4, H1A, H2A, H3A, and H4A) can be reduced.

In the case of the woven-type touch sensor structure according to embodiments of the present disclosure, parasitic capacitances formed between the horizontal electrodes (H1-H4) and the vertical electrodes (V1-V4) corresponding to touch electrodes TE and gate lines GL can be reduced, and thereby, touch sensitivity can be improved.

In some embodiments, each of the first horizontal electrode V1, the second horizontal electrode V2, the third horizontal electrode V3, and the plurality of first separation electrodes (H1A, H1B, H1C, and H1D) and the plurality of second separation electrodes (H2A, H2B, H2C, and H2D) may be formed such that one or more first layer electrodes L1E and one or more second layer electrodes L2E located in different layers with being separated by an insulating layer INS interposed therebetween are disposed to be electrically connected.

Referring to FIG. 13, the second vertical electrode V2 may include a first layer electrode L1E and a second layer electrode L2E. Each of the first separation electrode H1A disposed in the first row and the second separation electrode H2A disposed in the first row may include a first layer electrode L1E and a second layer electrode L2E, which are electrically separated from each other by the insulating layer INS.

The first horizontal connection line HCL1 connecting the first separation electrode H1A disposed in the first row and the second separation electrode H2A disposed in the first row may include a second layer electrode L2E.

The first horizontal connection line HCL1 including the second layer electrode L2E may run over or under the first layer electrode L1E of the second vertical electrode V2, and be electrically separated from the first layer electrode L1E of the second vertical electrode V2 by the insulating layer INS or another insulating layer.

For example, the first layer electrode L1E may include the same material as a pixel electrode disposed in a sub-pixel SP. The second layer electrode L2E may include the same material as a gate line GL or the gate electrode of a transistor in the sub-pixel SP.

Figure 14:
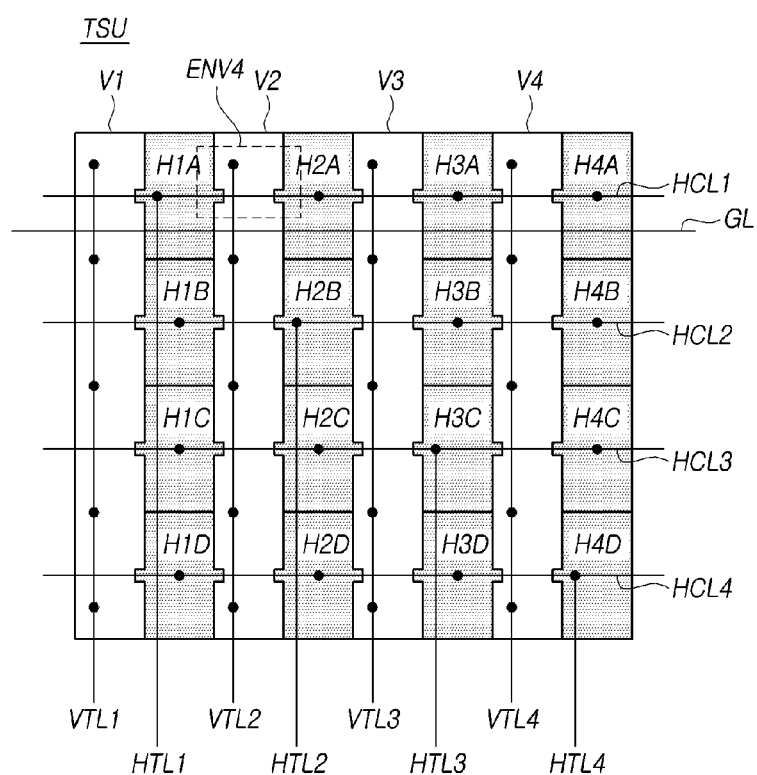
FIG. 14 illustrates an example touch sensor unit in the woven-type touch sensor structure of the touch display device according to aspects of the present disclosure.
Figure 15:
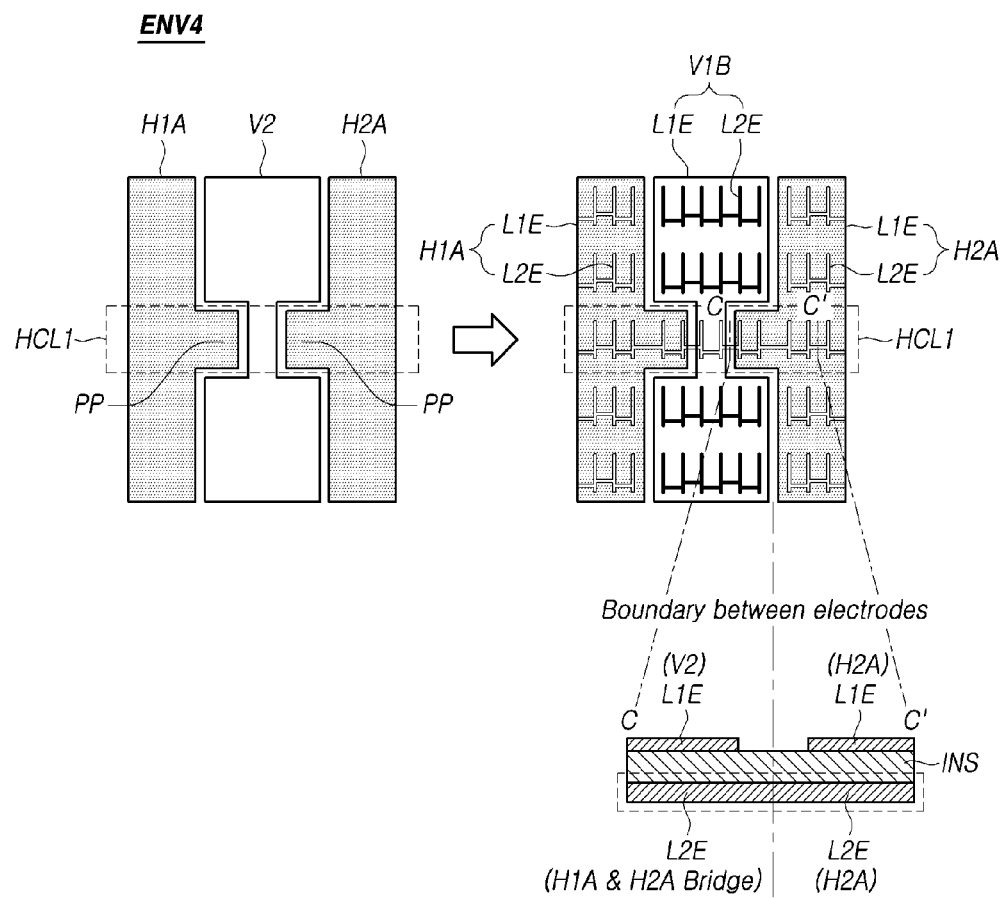
FIG. 15 illustrates an enlargement of a partial area in FIG. 14.

FIG. 14 illustrates an example touch sensor unit TSU in the woven-type touch sensor structure of the touch display device 100 according to aspects of the present disclosure. FIG. 15 illustrates an enlargement of a partial area ENV4 in FIG. 14.

The woven-type touch sensor structure shown in FIG. 14 is obtained by changing some configurations in the touch sensor structure of FIG. 12. Taking account of such a similarity, discussions will be conducted by focusing on configurations that are different from the touch sensor structure of FIG. 12 mainly described.

Referring to FIGS. 14 and 15, a second vertical electrode V2 may include a plurality of grooves on each of one side and the other side thereof. Each of a plurality of first separation electrodes (H1A, H1B, H1C, and H1D) may include a protrusion part PP interposed into a space provided by a corresponding groove of a plurality of grooves formed on the one side of the second vertical electrode V2. Each of a plurality of second separation electrodes (H2A, H2B, H2C, and H2D) may include a protrusion part PP interposed into a space provided by a corresponding groove of a plurality of grooves formed on the other side of the second vertical electrode V2.

A third vertical electrode V3 may include a plurality of grooves on each of one side and the other side thereof. Each of the plurality of second separation electrodes (H2A, H2B, H2C, and H2D) may include a protrusion part PP interposed into a space provided by a corresponding groove of a plurality of grooves formed on the one side of the third vertical electrode V3.

Referring to FIGS. 14 and 15, a first horizontal connection line HCL1 may run across the grooves formed on one side and the other side of the second vertical electrode V2, and the grooves formed on one side and the other side of the third vertical electrode V3.

Referring to FIG. 15, the second vertical electrode V2 may include a first layer electrode L1E and a second layer electrode L2E. Each of the first separation electrode H1A disposed in the first row and the second separation electrode H2A disposed in the first row may include a first layer electrode L1E and a second layer electrode L2E, which are electrically separated from each other by the insulating layer INS.

Referring to FIG. 15, the first horizontal connection line HCL1 connecting the first separation electrode H1A disposed in the first row and the second separation electrode H2A disposed in the first row may include a second layer electrode L2E.

The first horizontal connection line HCL1 including the second layer electrode L2E may run over or under the first layer electrode L1E of the second vertical electrode V2, and be electrically separated from the first layer electrode L1E of the second vertical electrode V2 by the insulating layer INS or another insulating layer.

For example, the first layer electrode L1E may include the same material as a pixel electrode disposed in a sub-pixel SP. The second layer electrode L2E may include the same material as a gate line GL or the gate electrode of a transistor in the sub-pixel SP.

Figure 16:
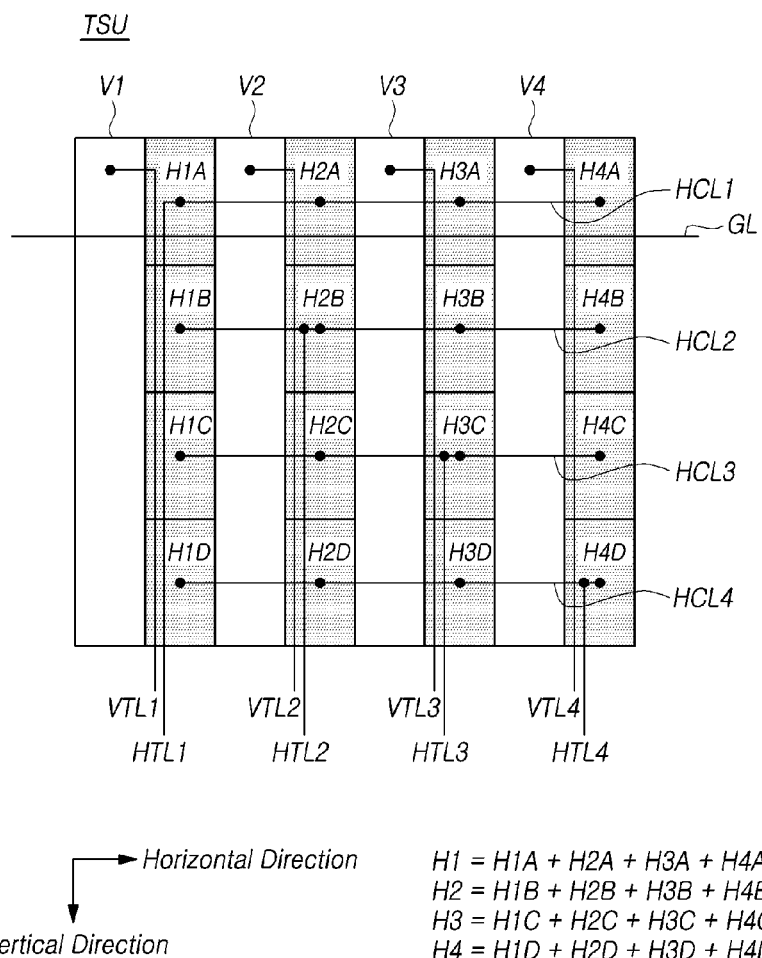
FIG. 16 illustrates an example touch sensor unit in the woven-type touch sensor structure of the touch display device according to aspects of the present disclosure.

FIG. 16 illustrates an example touch sensor unit TSU in the woven-type touch sensor structure of the touch display device 100 according to aspects of the present disclosure.

The woven-type touch sensor structure shown in FIG. 16 is obtained by changing some configurations in the touch sensor structure of FIG. 12. Taking account of such a similarity, discussions will be conducted by focusing on configurations that are different from the touch sensor structure of FIG. 12 mainly described.

Referring to FIG. 16, a first vertical touch line VTL1 may be disposed to extend in the horizontal direction and then bend to extend in the vertical direction while overlapping a plurality of first separation electrodes (H1A, H1B, H1C, and H1D), and be electrically separated from the plurality of first separation electrodes (H1A, H1B, H1C, and H1D) overlapping the first vertical touch line VTL1.

A first horizontal touch line HTL1 may overlap all, or one or more, of the plurality of first separation electrodes (all, or one or more, of H1A, H1B, H1C, and H1D) overlapping the first vertical touch line VTL1.

The first horizontal touch line HTL1 may be electrically connected to a first separation electrodes H1A disposed in a first row among all, or one or more, of the plurality of first separation electrodes (all, or one or more, of H1A, H1B, H1C, and H1D) overlapping the first vertical touch line VTL1, and be electrically separated from the first separation electrodes (H1B, H1C, and H1D) disposed in the remaining rows except for the first row.

A second vertical touch line VTL2 may be disposed to extend in the horizontal direction and then bend to extend in the vertical direction while overlapping all, or one or more, of a plurality of second separation electrodes (all, or one or more, of H2A, H2B, H2C, and H2D), and be electrically separated from all, or one or more, of the plurality of second separation electrodes (all, or one or more, of H2A, H2B, H2C, and H2D) overlapping the second vertical touch line VTL2.

A second horizontal touch line HTL2 may overlap all, or one or more, of the plurality of second separation electrodes (all, or one or more, of H2A, H2B, H2C, and H2D) overlapping the second vertical touch line VTL2.

The second horizontal touch line HTL2 may be electrically connected to a second separation electrodes H2B disposed in a second row among all, or one or more, of the plurality of second separation electrodes (all, or one or more, of H2A, H2B, H2C, and H2D) overlapping the second vertical touch line VTL2, and be electrically separated from the second separation electrodes (H2A, H2C, and H2D) disposed in the remaining rows except for the second row.

A third vertical touch line VTL3 may be disposed to extend in the horizontal direction and then bend to extend in the vertical direction while overlapping all, or one or more, of a plurality of third separation electrodes (all, or one or more, of H3A, H3B, H3C, and H3D), and be electrically separated from all, or one or more, of the plurality of third separation electrodes (all, or one or more, of H3A, H3B, H3C, and H3D) overlapping the third vertical touch line VTL3.

The third horizontal touch line HTL3 may overlap all, or one or more, of the plurality of third separation electrodes (all, or one or more, of H3A, H3B, H3C, and H3D) overlapping the third vertical touch line VTL3.

The third horizontal touch line HTL3 may be electrically connected to a third separation electrodes H3C disposed in a third row among all, or one or more, of the plurality of third separation electrodes (all, or one or more, of H3A, H3B, H3C, and H3D) overlapping the third vertical touch line VTL3, and be electrically separated from the third separation electrodes (H3A, H3B, and H3D) disposed in the remaining rows except for the third row.

A fourth vertical touch line VTL4 may be disposed to extend in the horizontal direction and then bend to extend in the vertical direction while overlapping all, or one or more, of a plurality of fourth separation electrodes (all, or one or more, of H4A, H4B, H4C, and H4D), and be electrically separated from all, or one or more, of the plurality of fourth separation electrodes (all, or one or more, of H4A, H4B, H4C, and H4D) overlapping the fourth vertical touch line VTL4.

The fourth horizontal touch line HTL4 may overlap all, or one or more, of the plurality of fourth separation electrodes (all, or one or more, of H4A, H4B, H4C, and H4D) overlapping the fourth vertical touch line VTL4.

The fourth horizontal touch line HTL4 may be electrically connected to a fourth separation electrodes H4D disposed in a fourth row among all, or one or more, of the plurality of fourth separation electrodes (all, or one or more, of H4A, H4B, H4C, and H4D) overlapping the fourth vertical touch line VTL4, and be electrically separated from the fourth separation electrodes (H4A, H4B, and H4C) disposed in the remaining rows except for the fourth row.

Figure 17:
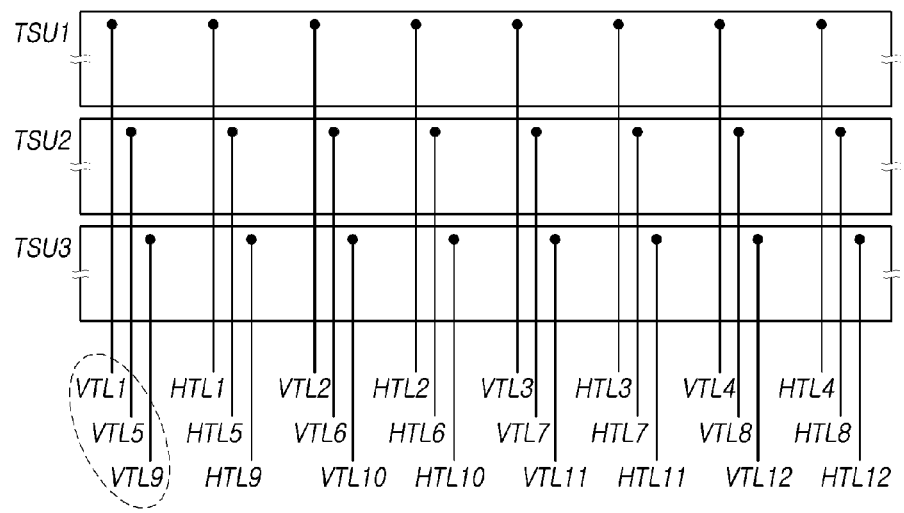
FIG. 17 illustrates an arrangement structure of touch lines disposed in three touch sensor units to which the woven-type touch sensor structure of FIGS. 8, 12 and 14 is applied.

FIG. 17 illustrates an arrangement structure of touch lines (VTL1-VTL12 and HTL1-HTL12) disposed in three touch sensor units TSU1, TSU2, and TSU3 to which the woven-type touch sensor structures of FIGS. 8, 12 and 14 are applied.

Referring to FIG. 17, three touch sensor units (TSU1, TSU2, and TSU3) are disposed adjacent to one another in the vertical direction.

The first touch sensor unit TSU1 may include first to fourth vertical touch lines (VTL1-VTL4) and first to fourth horizontal touch lines (HTL1-HTL4). The second touch sensor unit TSU2 may include fifth to eighth vertical touch lines (VTL5-VTL8) and fifth to eighth horizontal touch lines (HTL5-HTL8). The third touch sensor unit TSU3 may include ninth to twelfth vertical touch lines (VTL9-VTL12) and ninth to twelfth horizontal touch lines (HTL9-HTL12).

Referring to FIG. 17, according to the woven-type touch sensor structures of FIGS. 8, 12 and 14, vertical touch lines and horizontal touch lines may not be alternately disposed.

Accordingly, as shown in FIG. 17, the first, fifth and ninth vertical touch lines (VTL1, VTL5, VTL9), the first, fifth and ninth horizontal touch lines (HTL1, HTL5, HTL9), the second, sixth and tenth vertical touch lines (VTL2, VTL6, VTL10), the second, sixth and tenth horizontal touch lines (HTL2, HTL6, HTL10), the third, seventh and eleventh vertical touch lines (VTL3, VTL7, VTL11), the third, seventh and eleventh horizontal touch lines (HTL3, HTL7, HTL11), the fourth, eighth and twelfth vertical touch lines (VTL4, VTL8, VTL12), and the fourth, eighth and twelfth horizontal touch lines (HTL4, HTL8, HTL12) may be sequentially disposed.

Figure 18:
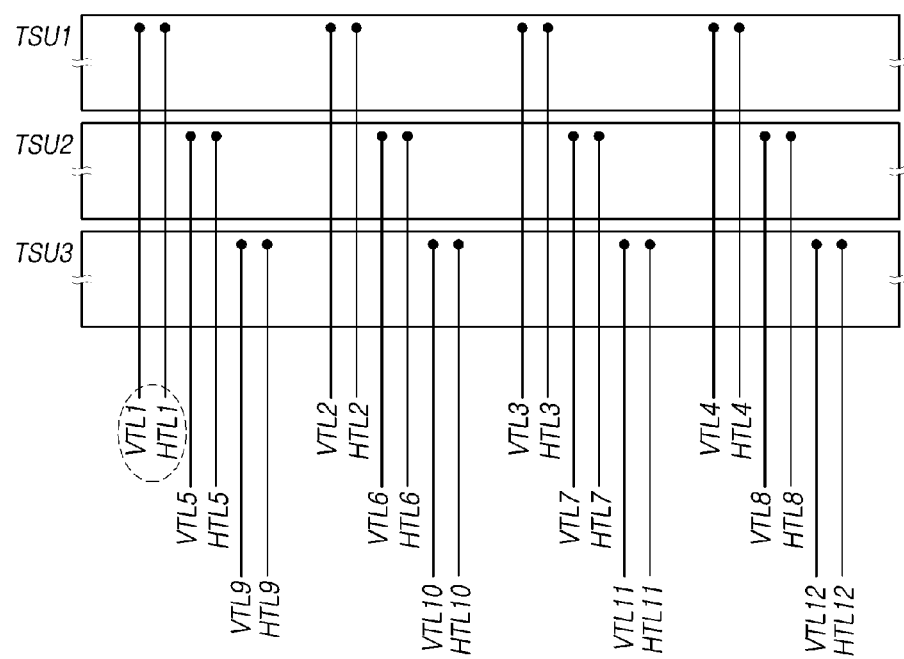
FIG. 18 illustrates an arrangement structure of touch lines disposed in three touch sensor units to which the woven-type touch sensor structure of FIGS. 10 and 16 is applied.

FIG. 18 illustrates an arrangement structure of touch lines disposed in three touch sensor units to which the woven-type touch sensor structures of FIGS. 10 and 16 are applied.

According to the woven-type touch sensor structure shown in FIG. 10, as the vertical touch lines (VTL1-VTL4) are connected in the protrusion parts PP of the separation electrodes included in the vertical electrodes (V1-V4), and are disposed to overlap the horizontal electrodes (H1-H4), when the woven-type touch sensor structure shown in FIG. 10 is applied, the vertical touch lines and the horizontal touch lines can be alternately disposed in areas where the separation electrodes included in the horizontal electrodes (H1-H4) are disposed.

According to the woven-type touch sensor structure shown in FIG. 16, as the vertical touch lines (VTL1-VTL4) are disposed to extend in the horizontal direction, bend in the vertical direction in areas in which the separation electrodes included in the horizontal electrodes (H1-H4) are disposed, and extend in the vertical direction while overlapping the separation electrodes, when the woven-type touch sensor structure shown in FIG. 16 is applied, the vertical touch lines and the horizontal touch lines can be alternately disposed in the areas of the separation electrodes included in the horizontal electrodes (H1-H4).

Therefore, when the woven-type touch sensor structures of FIGS. 10 and 16 are applied, referring to FIG. 18, the first vertical touch line VTL1, the first horizontal touch line HTL1, the fifth vertical touch line VTL5, the fifth horizontal touch line HTL5, the ninth vertical touch line VTL9, the ninth horizontal touch line HTL9, the second vertical touch line VTL2, the second horizontal touch line HTL2, the sixth vertical touch line VTL6, the sixth horizontal touch line HTL6, the tenth vertical touch line VTL10, the tenth horizontal touch line HTL10, the third vertical touch line VTL3, the third horizontal touch line HTL3, the seventh vertical touch line VTL7, the seventh horizontal touch line HTL7, the eleventh vertical touch line VTL11, the eleventh horizontal touch line HTL11, the fourth vertical touch line VTL4, the fourth horizontal touch line HTL4, the eighth vertical touch line VTL8, the eighth horizontal touch line HTL8, the twelfth vertical touch line VTL12, and the twelfth horizontal touch line HTL12 may be sequentially disposed.

This vertical and/or horizontal alternating arrangement can be suitable for enabling the touch driving circuit 310 to efficiently perform touch driving for sensing each touch node. Accordingly, connections between the touch lines and the touch driving circuit 310 can be accomplished more easily.

Figure 19:
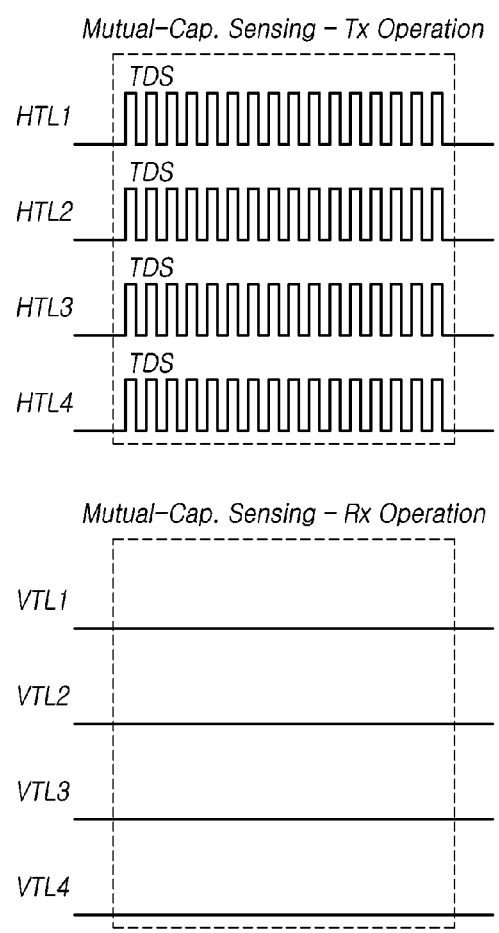
FIG. 19 is a signal diagram illustrating driving timings for mutual-capacitance sensing in the touch display device according to aspects of the present invention.

FIG. 19 is a signal diagram illustrating driving timings for mutual-capacitance sensing in the touch display device 100 according to aspects of the present invention.

Referring to FIG. 19, the touch sensing circuit 300 of the touch display device 100 according to aspects of the present disclosure has capabilities to provide mutual-capacitance-based touch sensing.

Referring to FIG. 19, among four horizontal electrodes (H1-H4) and four vertical electrodes (V1-V4) in a touch sensing unit TSU, the four horizontal electrodes (H1-H4) may be driving touch electrodes (transmitting touch electrodes Tx), and the four vertical electrodes (V1-V4) may be sensing touch electrodes (receiving touch electrodes Rx).

In this case, the touch sensing circuit 300 can supply touch driving signals TDS to the four horizontal electrodes (H1-H4) through four horizontal touch lines (HTL1-HTL4) in the touch sensing unit TSU, and receive touch sensing signals from the four vertical electrodes (V1-V4) through four vertical touch lines (VTL1-VTL4) in the touch sensing unit TSU.

The touch sensing circuit 300 can detect capacitances between the four vertical electrodes (V1-V4) and the four horizontal electrodes (H1-H4) based on the received touch sensing signals, and determine the presence or absence of a touch based on the detected results and/or calculate touch coordinates.

In a different manner to the configuration of FIG. 19, among four horizontal electrodes (H1-H4) and four vertical electrodes (V1-V4) in a touch sensing unit TSU, the four vertical electrodes (V1-V4) may be driving touch electrodes (transmitting touch electrodes Tx), and the four horizontal electrodes (H1-H4) may be sensing touch electrodes (receiving touch electrodes Rx).

Figure 20:
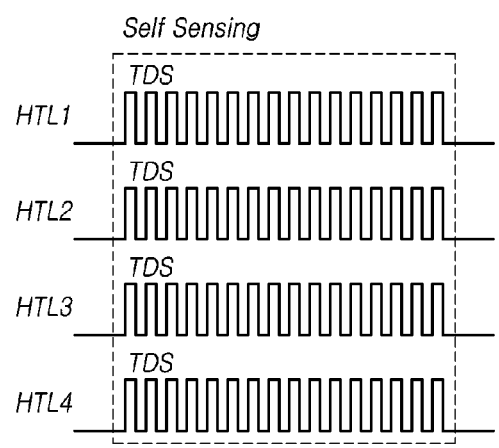
FIG. 20 is a signal diagram illustrating driving timings for self-capacitance sensing in the touch display device according to aspects of the present invention.
Figure 20:
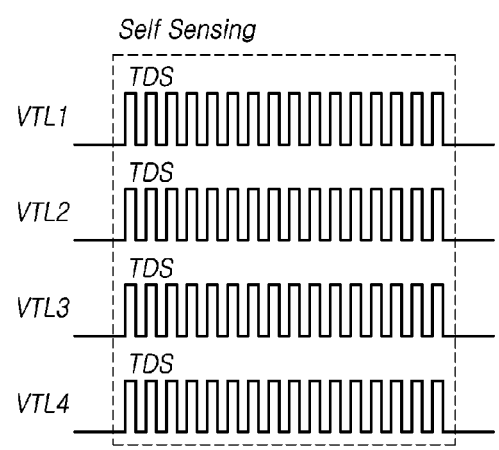

FIG. 20 is a signal diagram illustrating driving timings for self-capacitance sensing in the touch display device 100 according to aspects of the present invention.

Referring to FIG. 20, the touch sensing circuit 300 of the touch display device 100 according to aspects of the present disclosure has capabilities to provide self-capacitance-based touch sensing.

Referring to FIG. 20, the touch sensing circuit 300 can supply one or more touch driving signals TDS to one or more of four horizontal electrodes (H1-H4) and four vertical electrodes (V1-V4) through at least one of four horizontal touch lines (HTL1-HTL4) and four vertical touch lines (VTL1-VTL4) in a touch sensing unit TSU, and receive one or more touch sensing signals from one or more electrodes to which the one or more touch driving signals TDS are supplied.

The touch sensing circuit 300 can determine the presence or absence of a touch based on the received touch sensing signals, and/or calculate touch coordinates.

According to the embodiments of the present disclosure, it is possible to provide touch display devices 100 having the woven-type touch sensor structure capable of reducing the number of touch lines and touch channels while maintaining the accuracy of touch sensing.

According to the embodiments of the present disclosure, it is possible to provide touch display devices 100 having the woven-type touch sensor structure capable of reducing overlapping areas between touch electrodes TE and display lines (GL, DL).

According to the embodiments of the present disclosure, it is possible to provide touch display devices 100 having the woven-type touch sensor structure capable of improving touch sensitivity by reducing a difference in areas (sizes) between two types of touch electrodes (e.g., a horizontal electrode and a vertical electrode).

The embodiments of the present disclosure described above have been described for illustrative purposes; those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specific embodiments.

What is claimed is:

1. A touch display device comprising:
a first vertical electrode extending in a vertical direction;
a second vertical electrode spaced apart from the first vertical electrode in a horizontal direction and extending in the vertical direction;
a third vertical electrode spaced apart from the second vertical electrode in the horizontal direction and extending in the vertical direction;
a first vertical touch line electrically connected to the first vertical electrode and extending in the vertical direction;
a second vertical touch line electrically connected to the second vertical electrode and extending in the vertical direction;
a third vertical touch line electrically connected to the third vertical electrode and extending in the vertical direction;
a plurality of first separation electrodes located between the first vertical electrode and the second vertical electrode and spaced apart from one another in the vertical direction;
a plurality of second separation electrodes located between the second vertical electrode and the third vertical electrode and spaced apart from one another in the vertical direction;
a first horizontal connection line electrically connecting a first separation electrode in a first row of the plurality of first separation electrodes and a second separation electrode in the first row of the plurality of second separation electrodes, the first horizontal connection line overlapping at least a portion of the first separation electrode that is between a first end of the first separation electrode and a second end of the first separation electrode that is opposite the first end of the first separation electrode in a plan view of the touch display device, and the first horizontal connection line extending from the portion of the first separation electrode that is between the first end of the first separation electrode and the second end of the first separation electrode to the second separation electrode such that the first horizontal connection line overlaps an entire width of the second separation electrode that is between a first end of the second separation electrode and a second end of the second separation electrode that is opposite the first end of the second separation electrode in the plan view of the touch display device;
a first horizontal touch line electrically connected to the first horizontal connection line and extending in the vertical direction, the first horizontal touch line overlapping one or more of the plurality of first separation electrodes in the plan view of the touch display device;
a second horizontal connection line electrically connecting a first separation electrode in a second row of the plurality of first separation electrodes and a second separation electrode in the second row of the plurality of second separation electrodes; and
a second horizontal touch line electrically connected to the second horizontal connection line and extending in the vertical direction,
wherein the first vertical touch line extends in the horizontal direction, and then, bend and extend in the vertical direction while overlapping all, or one or more, of the plurality of first separation electrodes, and is electrically separated from all, or one or more, of the plurality of first separation electrodes overlapping the first vertical touch line.

2. The touch display device according to claim 1, wherein the second vertical electrode includes a plurality of grooves on at least one of one side and another side thereof,
wherein each of the plurality of first separation electrodes includes a protrusion located in a corresponding groove of the plurality of grooves on the one side of the second vertical electrode.

3. The touch display device according to claim 2, wherein each of the plurality of second separation electrodes includes a protrusion located in a corresponding groove of the plurality of grooves on the other side of the second vertical electrode.

4. The touch display device according to claim 3, wherein the third vertical electrode includes a plurality of grooves on at least one of one side and the other side thereof, and
wherein each of the plurality of second separation electrodes includes a protrusion located in a corresponding groove of the plurality of grooves on the one side of the third vertical electrode.

5. The touch display device according to claim 4, wherein the first horizontal connection line extends along the grooves disposed on each of the one side and the other side of the second vertical electrode and the grooves disposed on each of the one side and the other side of the third vertical electrode.

6. The touch display device according to claim 1, wherein the first horizontal touch line overlaps all, or one or more, of the plurality of first separation electrodes overlapping the first vertical touch line, is electrically connected to the first separation electrode in the first row of all, or one or more, of the plurality of first separation electrodes overlapping the first vertical touch line, and is electrically separated from one or more first separation electrodes in remaining rows except for the first row.

7. The touch display device according to claim 1, further comprising a gate line disposed in the horizontal direction and disposed parallel to the first and second horizontal connection lines,
wherein the gate line extends along the first vertical electrode, the first separation electrode, the second vertical electrode, the second separation electrode, and the third vertical electrode.

8. The touch display device according to claim 7, further comprising a gate driving circuit configured to drive the gate line by supplying a gate signal to the gate line.

9. The touch display device according to claim 1, further comprising a data line disposed in the vertical direction,
wherein the first vertical touch line, the second vertical touch line, and the third vertical touch line are disposed parallel to the data line, and the first horizontal touch line and the second horizontal touch line are disposed parallel to the data line, and
wherein the first and second horizontal connection lines cross the data line.

10. The touch display device according to claim 9, further comprising a data driving circuit configured to drive the data line by supplying a data voltage to the data line.

11. The touch display device according to claim 1, wherein each of the first vertical electrode, the second vertical electrode, the third vertical electrode, the plurality of first separation electrodes, and the plurality of second separation electrodes is disposed such that one or more first layer electrodes and one or more second layer electrodes located in different layers are disposed to be electrically connected to each other.

12. The touch display device according to claim 1, wherein each of the first separation electrode disposed in the first row of the plurality of first separation electrodes and the second separation electrode in the first row of the plurality of second separation electrodes includes a first layer electrode and a second layer electrode that are electrically separated by an insulating layer.

13. The touch display device according to claim 1, wherein the first vertical touch line, the first horizontal touch line, the second vertical touch line and the second horizontal touch line are sequentially disposed.

14. The touch display device according to claim 1, further comprising a driving circuit that is electrically connected to the first vertical electrode through the first vertical touch line, the second vertical electrode through the second vertical touch line, the third vertical electrode through the third vertical touch line, the first and second separation electrodes electrically connected to the first horizontal connection line through the first horizontal touch line, and the first and second separation electrodes electrically connected to the second horizontal connection line through the second horizontal touch line.

15. The touch display device of claim 1, wherein the second horizontal touch line overlaps one or more of the plurality of second separation electrodes in the plan view of the touch display device.

16. The touch display device of claim 1, wherein the first vertical touch line overlaps the first vertical electrode in the plan view of the touch display device and the second vertical touch line overlaps the second vertical electrode in the plan view of the touch display device.

17. A touch display device comprising:
a first vertical electrode extending in a vertical direction;
a second vertical electrode spaced apart from the first vertical electrode in a horizontal direction and extending in the vertical direction;
a third vertical electrode spaced apart from the second vertical electrode in the horizontal direction and extending in the vertical direction;
a first vertical touch line electrically connected to the first vertical electrode and extending in the vertical direction;
a second vertical touch line electrically connected to the second vertical electrode and extending in the vertical direction;
a third vertical touch line electrically connected to the third vertical electrode and extending in the vertical direction;
a plurality of first separation electrodes located between the first vertical electrode and the second vertical electrode and spaced apart from one another in the vertical direction;
a plurality of second separation electrodes located between the second vertical electrode and the third vertical electrode and spaced apart from one another in the vertical direction;
a first horizontal connection line electrically connecting a first separation electrode in a first row of the plurality of first separation electrodes and a second separation electrode in the first row of the plurality of second separation electrodes;
a first horizontal touch line electrically connected to the first horizontal connection line and extending in the vertical direction;
a second horizontal connection line electrically connecting a first separation electrode in a second row of the plurality of first separation electrodes and a second separation electrode in the second row of the plurality of second separation electrodes; and
a second horizontal touch line electrically connected to the second horizontal connection line and extending in the vertical direction,
wherein the first vertical touch line extends in the horizontal direction, and then, bends and extends in the vertical direction while overlapping all, or one or more, of the plurality of first separation electrodes, and is electrically separated from all, or one or more, of the plurality of first separation electrodes overlapping the first vertical touch line.

* * * * *